(12) United States Patent
Kudo et al.

(10) Patent No.: US 7,908,258 B2
(45) Date of Patent: Mar. 15, 2011

(54) SEARCH KEYWORD INPUT DEVICE, SEARCH KEYWORD INPUT METHOD, AND SEARCH KEYWORD INPUT PROGRAM

(75) Inventors: Shigetaka Kudo, Kanagawa (JP); Takashi Koya, Kanagawa (JP); Ryu Okuda, Tokyo (JP)

(73) Assignee: Sony Corporation, Tokyo (JP)

( * ) Notice: Subject to any disclaimer, the term of this patent is extended or adjusted under 35 U.S.C. 154(b) by 219 days.

(21) Appl. No.: 11/709,746

(22) Filed: Feb. 23, 2007

(65) Prior Publication Data

US 2007/0220052 A1 Sep. 20, 2007

(30) Foreign Application Priority Data

Mar. 9, 2006 (JP) ................................ P2006-064586

(51) Int. Cl.
*G06F 7/00* (2006.01)
*G06F 3/048* (2006.01)

(52) U.S. Cl. ......... 707/705; 707/769; 715/713; 715/828; 715/841

(58) Field of Classification Search ............... 707/104.1, 707/705, 769; 715/713, 828, 841
See application file for complete search history.

(56) References Cited

U.S. PATENT DOCUMENTS

| 7,546,551 | B2 * | 6/2009 | Sakata et al. ................... 715/841 |
| 2003/0177113 | A1 | 9/2003 | Wakita |
| 2005/0021470 | A1 * | 1/2005 | Martin et al. .................... 705/51 |
| 2005/0096812 | A1 * | 5/2005 | Nezu et al. ....................... 701/36 |
| 2006/0190842 | A1 * | 8/2006 | Young Suk Lee ............ 715/810 |
| 2007/0220580 | A1 * | 9/2007 | Putterman et al. ............. 725/134 |
| 2008/0281867 | A1 * | 11/2008 | Kendall et al. ............. 707/104.1 |

FOREIGN PATENT DOCUMENTS

| JP | 10-289251 | 10/1998 |
| JP | 2001-318944 | 11/2001 |
| JP | 2002-82972 | 3/2002 |
| JP | 2003-271630 | 9/2003 |

* cited by examiner

*Primary Examiner* — Apu M Mofiz
*Assistant Examiner* — Cindy Nguyen
(74) *Attorney, Agent, or Firm* — Finnegan, Henderson, Farabow, Garrett and Dunner, L.L.P.

(57) ABSTRACT

A search keyword input device includes multiple keyword type selection keys for showing multiple keyword types for the purpose of distinguishing and narrowing down multiple search keywords so as to be selectable, and used for selection of the multiple keyword types, a display unit which corresponds to the multiple keyword type selection keys, and which displays multiple selecting notification display elements for the purpose of notifying that the multiple keyword types are selected, and a control unit for controlling the selecting notification display elements corresponding to the keyword type selection keys to be displayed on the display unit as instructed when the keyword type selection key for selection of the keyword type is instructed.

6 Claims, 21 Drawing Sheets

FIG. 10

| GENRE | COMPOSITION TITLE | URL |
|---|---|---|
| GENRE 1 | TITLE 1 | URL1 |
| | TITLE 2 | URL2 |
| | ⋮ | ⋮ |
| | TITLE 8 | URL8 |
| | TITLE 9 | URL9 |
| GENRE 2 | TITLE 10 | URL10 |
| | TITLE 11 | URL11 |
| | ⋮ | ⋮ |
| ⋮ | ⋮ | ⋮ |
| GENRE K | ⋮ | ⋮ |
| | TITLE N | URLN |

| ARTIST NAME | COMPOSITION TITLE | URL |
|---|---|---|
| ARTIST NAME 1 | TITLE 1 | URL1 |
| | TITLE 2 | URL2 |
| | ⋮ | ⋮ |
| | TITLE 6 | URL6 |
| ARTIST NAME 2 | TITLE 7 | URL7 |
| | TITLE 8 | URL8 |
| | TITLE 9 | URL9 |
| ⋮ | ⋮ | ⋮ |
| ARTIST NAME L | ⋮ | ⋮ |
| | TITLE N | URLN |

| | COMPOSITION TITLE | URL |
|---|---|---|
| ALL COMPOSITIONS | TITLE 1 | URL1 |
| | TITLE 2 | URL2 |
| | TITLE 3 | URL3 |
| | ⋮ | ⋮ |
| | TITLE N | URLN |

RPL

| ARTIST NAME | COMPOSITION TITLE | URL |
|---|---|---|
| ARTIST 1 | TITLE 1 | URL1 |
| | TITLE 2 | URL2 |
| | ⋮ | ⋮ |
| | TITLE 6 | URL6 |
| ARTIST 2 | TITLE 7 | URL7 |
| | TITLE 8 | URL8 |
| | TITLE 9 | URL9 |

FIG. 15B

DPL

| ALBUM NAME | COMPOSITION TITLE | URL |
|---|---|---|
| ALBUM 5 | TITLE 10 | URL10 |
| | TITLE 11 | URL11 |
| | TITLE 12 | URL12 |
| ALBUM 6 | TITLE 13 | URL13 |
| | TITLE 14 | URL14 |
| | TITLE 15 | URL15 |

FIG. 19

| STATUS | DISPLAY BEFORE CHANGE | | | DISPLAY AFTER CHANGE | | | |
|---|---|---|---|---|---|---|---|
| | | | | GENRE SELECTION KEY | ARTIST SELECTION KEY | ALBUM SELECTION KEY | |
| ① | | | | | | | |
| ② | | | ◎ | | | | |
| ③ | | ᛫ | | | | SELECTION OF SEARCH KEYWORD | |
| ④ | | ᛫ | ◎ | | | | |
| ⑤ | ᛫ | | | SELECTION OF SEARCH KEYWORD | | | |
| ⑥ | ᛫ | | ◎ | | | SELECTION OF SEARCH KEYWORD | |
| ⑦ | ᛫ | ᛫ | | | SELECTION OF SEARCH KEYWORD | | |
| ⑧ | ᛫ | ᛫ | ◎ | | | SELECTION OF SEARCH KEYWORD | |

SEARCH KEYWORD INPUT DEVICE, SEARCH KEYWORD INPUT METHOD, AND SEARCH KEYWORD INPUT PROGRAM

CROSS REFERENCES TO RELATED APPLICATIONS

The present invention contains subject matter related to Japanese Patent Application JP 2006-064586 filed in the Japanese Patent Office on Mar. 9, 2006, the entire contents of which are incorporated herein by reference.

BACKGROUND OF THE INVENTION

1. Field of the Invention

The present invention relates to a search keyword input device, a search keyword input method, and a search keyword input program, which is suitably applied to an audio system which searches and plays back desired music composition data from a large amount of music composition data, for example.

2. Description of the Related Art

With a known image searching system, multiple image data is each correlated with at least one keyword and stored. Also an image searching system separates and groups the multiple keywords by type, and stores keyword icons illustrating these multiple keywords in a manner correlated with the group icons showing the group to which the keywords belong. The image searching system shows a graphic user interface for searching (hereafter called searching GUI) on a display, and allows a user to select a group icon within the group icon display region of this searching GUI, as well as displaying the keyword icon corresponding to this selected group icon within the keyword icon display region of the searching GUI. Then after the desired keyword icon is moved from the keyword icon display region within the searching GUI to the search criteria setting region, when a criteria finalize button is pressed, the image data is searched using the keyword shown by the keyword icon within the search criteria setting region (for example, see Japanese Unexamined Patent Application Publication No. 10-289251 (page 4, FIGS. 2 and 4)).

SUMMARY OF THE INVENTION

With an image searching system with such a configuration, however, multiple group icons are appropriately switched to be displayed within the group icon display region of the searching GUI, and allowing a user to select the group icon for the desired group. Thus, with the image searching system, it is difficult to readily make the user aware of which group icons exist. Also with the image searching system, multiple keywords are sequentially selected, but because the group icon displayed on within the group icon display region of the searching GUI changes according to the keyword selection, making the user aware of the group wherein a keyword is selected again from a previously selected group is not easily achieved. Accordingly, with an image searching system which has been used up to now, there has been the disadvantage of the user not being able to easily select the keyword.

The present invention has been made in light of the above problem. Embodiments of the present invention provide for a search keyword input device, search keyword input method, and search keyword input program which enables easily selecting the search keyword.

According to an embodiment of the present invention, selecting notification display elements corresponding to instructed keyword selection keys are controlled so as to be displayed on a display unit which displays multiple selecting notification display elements for the purpose of notifying that multiple keyword types correspond to the multiple keyword type selection keys and have been selected, when multiple keyword type selection keys for showing multiple keyword types for the purpose of distinguishing and narrowing down multiple search keywords so as to be selectable, and used for selection of the multiple keyword types, are instructed as the selectable keyword types.

Accordingly, with the multiple keyword type selection keys, the user can be made aware, clearly and easily, of what sort of keyword types exist, and also with the display of selecting notification display elements according to instructions from the keyword type selection keys the user can easily confirm which keyword type has been selected.

Thus, by performing controls to display the selecting notification display elements corresponding to the instructed keyword type selection keys on the display unit, which displays multiple selecting notification display elements for the purpose of notifying that the multiple keyword types correspond to the multiple keyword type selection keys and have been selected, when multiple keyword type selection keys for showing multiple keyword types for the purpose of distinguishing and narrowing down multiple search keywords so as to be selectable, and used for selection of the multiple keyword types, are instructed as the selectable keyword types, with the multiple keyword type selection keys, the user can be made aware, clearly and easily, of what sort of keyword types exist, and also with the display of selecting notification display elements according to instructions from the keyword type selection keys the user can easily confirm which keyword type has been selected, thus realizing a search keyword input device, search keyword input method, and search keyword input program which enables a user to easily select the search keyword.

BRIEF DESCRIPTION OF THE DRAWINGS

FIG. 10 is a schematic diagram illustrating a genre list configuration;

FIG. 11 is a schematic diagram illustrating an artist list configuration;

FIG. 13 is a schematic diagram illustrating an all-composition list configuration;

FIG. 15 is a schematic diagram of the configuration of a partial list by type;

FIG. 19 is a schematic diagram describing the display of keyword type selecting notification icons according to pressing operation of a keyword type selection key;

DESCRIPTION OF THE PREFERRED EMBODIMENTS

An embodiment of the present invention will be described below with reference to the drawings.

Figure 1:
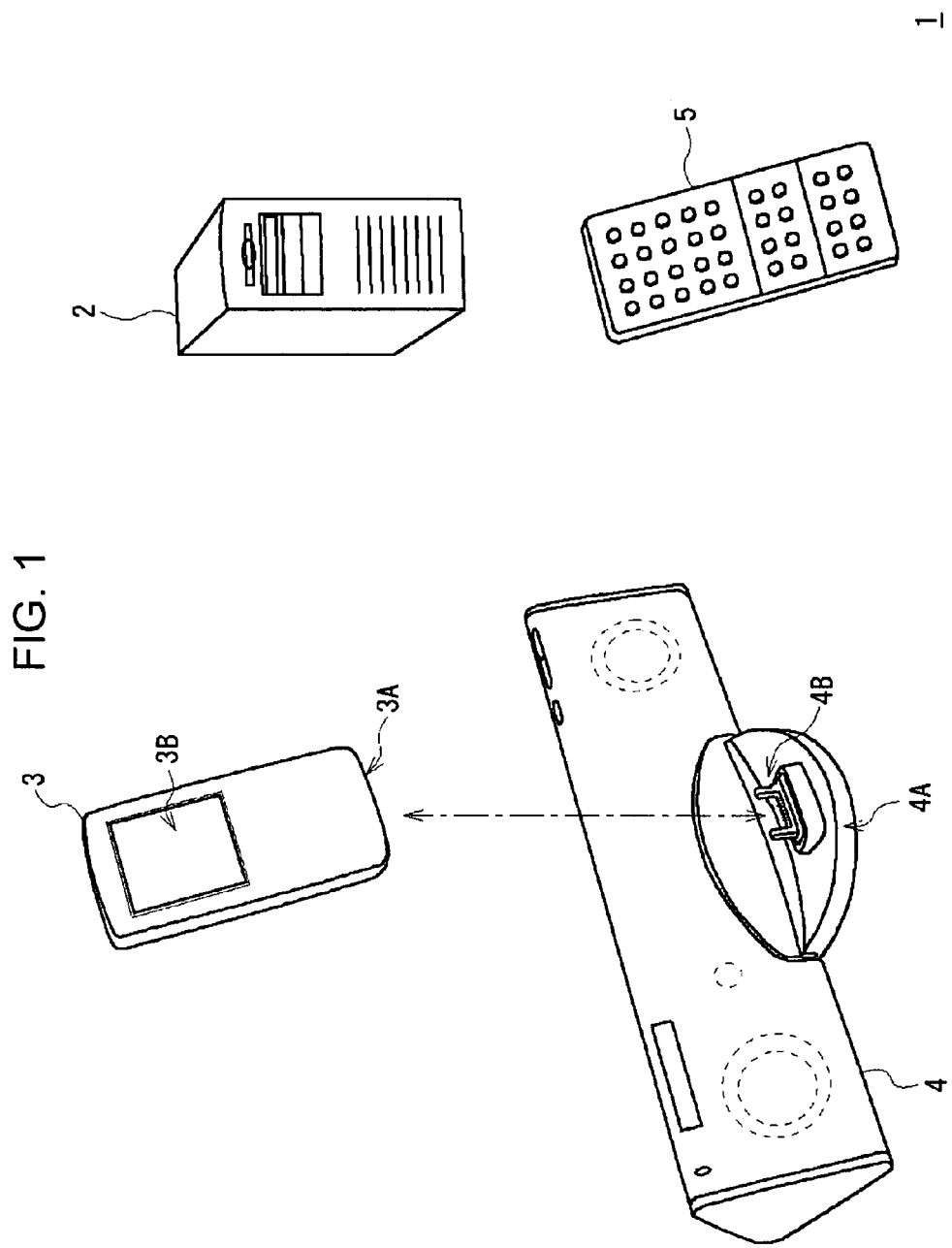
FIG. 1 is a schematic diagram illustrating one embodiment of the overall configuration of an audio system according to the present invention.
Figure 2:
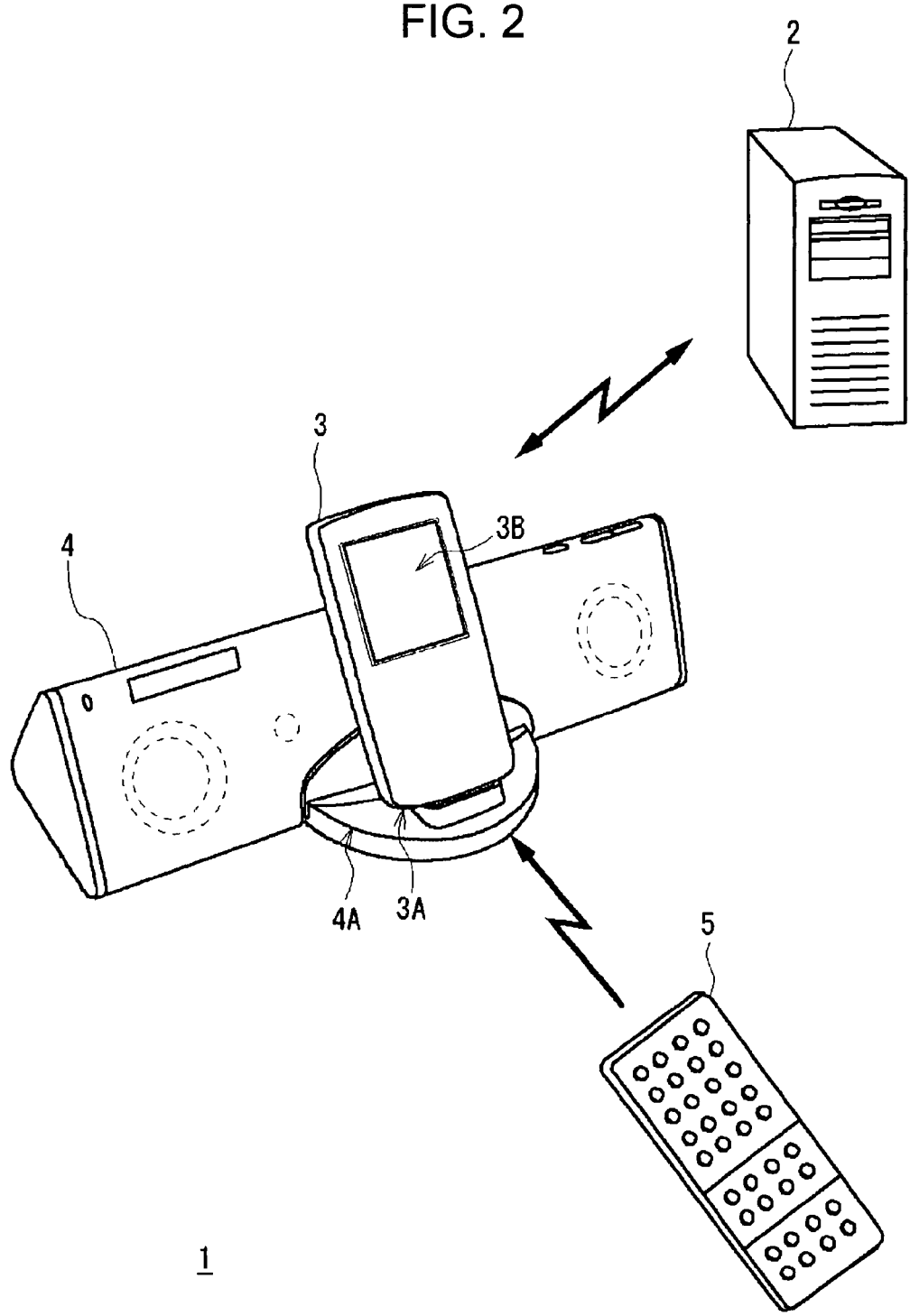
FIG. 2 is a schematic diagram illustrating the configuration at time of operation of the audio system.

With FIG. 1, the reference numeral 1 denotes an audio system to which the present invention is applied as a whole, comprising a server 2 for storing multiple composition data, and a wireless communication module 3 for wirelessly communicating according to wireless LAN (Local Area Network) standards such as IEEE (Institute of Electrical and Electronics Engineers) 802.11 for example, which can be mounted on a mounting portion 4A provided on the front center portion of a cradle 4 which includes speakers therewithin. A connecting terminal (hereafter called a cradle side terminal) 4B is provided on the mounting portion 4A of the cradle 4. Also, an unshown connecting terminal (hereafter called module side terminal) is also provided on a mounting portion contact face 3A which is the bottom face of the wireless communication module 3. Thus as shown in FIG. 2, with the audio system 1, if the wireless communication module 3 is mounted on the mounting portion 4A of the cradle 4 in a position wherein a display 3B such as an LCD (Liquid Crystal Display) or the like provided on the casing front face of the wireless communication module 3 is facing the front side of the front face of the cradle 4, the module side terminal and the cradle side terminal 4B are fit together, and so the wireless communication module 3 and the cradle 4 are electrically connected. In this state, the audio system 1 can operate the wireless communication module 3 according to user operation of the remote controller 5, as well as control the server 2 and cradle 4 via the wireless communication module 3. Thus with the audio system 1, the wireless communication module 3 acquires composition data from the server 2 wirelessly, and transfers this to the cradle 4 via the module side terminal and the cradle side terminal 4B, sequentially, thus performing playback processing of the composition data in a streaming format, and so outputting the composition based on the composition data from the speakers of the cradle 4 and enabling the user to listen.

Figure 3:
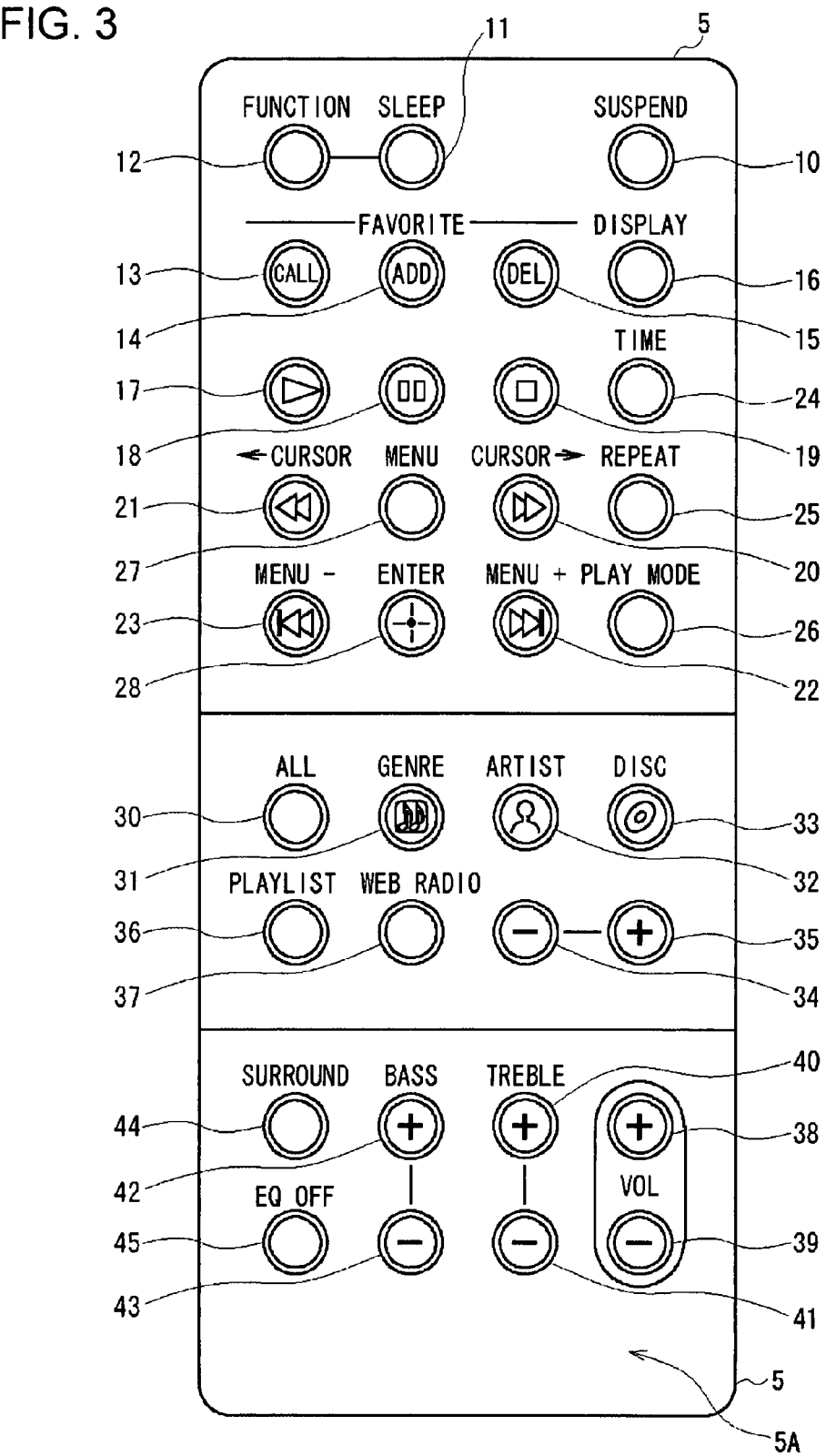
FIG. 3 is a schematic diagram illustrating the configuration of a remote controller.

As shown in FIG. 3, a power on/off key 10 for turning the power of the wireless communication module 3 on or off, a sleep mode key 11 for setting the wireless communication module 3 during operation to a sleep mode so as to turn the power off after a predetermined amount of time selected in advance, and a function selection key 12 for selecting which the wireless communication module 3 is to realize of a composition data acquiring function which acquires composition data already stored from the server 2 and a distribution data acquiring function which acquires composition data distributed on a network such as the Internet via the server 2, are provided on one face 5A of the remote controller 5. Also, a favorites list call key 13 for the wireless communication module 3 to call up a list, from the server 2, wherein only compositions registered as favorites of the user are registered therein (hereafter referred to as favorites list) during playback processing of the composition data, a composition registration key 14 for registering a composition in the favorites list when the user likes the composition thereof during playback of the composition (that is to say, while the user is listening to the composition being output from the speakers in the cradle 4), and a registration deleting key 15 for canceling the registration of a composition during playback of the composition registered to the favorites list, are provided on one face 5A of the remote controller 5. Further, a display switchover key 16 for switching display content on the display 3B of the wireless communication module 3 is also provided on one face 5A of the remote controller 5.

Further, a playback start key 17 for starting playback of the composition, a pause key 18 for temporarily stopping playback of the composition, a playback stop key 19 for stopping playback of the composition, a fast-forward key 20 for fast-forwarding a composition during playback, a fast-rewind key 21 for fast-rewinding, a next track key 22 and a previous track key 23 for switching compositions to be played, are also provided on one face 5A of the remote controller 5. Also, a playback time display switchover key 24 for switching the display mode for the playback time for a composition during playback (that is to say, a sum display mode for summing the playback time sequentially following along with the progression of playback, and a subtracting display mode for subtracting the playback time sequentially following along with the progression of playback), a repeat playback mode selection key 25 for selecting either a multiple repeat playback mode for cyclically repeating multiple compositions (that is to say, multiple repeats) or a one-composition repeat playback mode (that is to say, one song is repeated) as the composition playback mode, and a playback mode selection key 26 for selecting either a normal playback mode for playing multiple compositions in a playback order set on the server 2 side (that is to say, continue mode) or rearrange playback mode for rearranging the playback order set on the server 2 side but reordered arbitrarily (that is to say, shuffle mode), are also provided on one face 5A of the remote control.

Note that a menu display key 27 for displaying a main menu on the display 3B of the wireless communication module 3 is provided on one face 5A of the remote controller 5, and also an enter key 28 for entering information selected by the user or input information is also provided thereupon. Also, the multiple menu items are associated as to the main menu, and therefore when the main menu is displayed on the display 3B, the remote controller 5 causes the next track key 22 and previous track key 23 to function as an item selecting key for switching to the main menu and selecting and displaying menu items, and causes the fast-forward key 20 and fast-rewind key 21 to function as a cursor moving key for moving the pointing element (that is to say, the cursor) for indicating input position of information such as numeric values within an information input space for menu items.

Additionally, a search criteria selection key (hereafter called all-composition selection key) 30, for selecting a search criteria called "all compositions" wherein, in the event of searching composition data to be played back with the wireless communication module 3 from the multiple composition data stored on the server 2, all composition data stored in the server 2 is to be played back, is provided on one face 5A of the remote controller 5. Note that the server 2 has stored a large amount of composition data, as well as associated information associated to the compositions (hereafter also referred to as composition associated information), such as names of genre to which the compositions for each composition data belongs (hereafter called genre name), names of artists performing the compositions (hereafter called artist name), titles of the album disks wherein the compositions are stored (hereafter called album name). The server 2 manages the large amount of composition data in a multi-level hierarchical configuration by composition associated information so as to correspond the large amount of composition data each hierarchically by genre name, artist name, and album name. On the other hand, the wireless communication module 3 uses genre name, artist name, and album name as search keywords for searching the composition data to be played from the large amount of composition data stored in the server 2. The wireless communication module 3 uses the types "genre", "artist", and "album disk" for managing the composition data which distinguish the genre name, artist name, and album name, so as to distinguish and narrow down by search keyword so as to be selectable (hereafter called keyword type). Accordingly the wireless communication module 3 permits selection of genre name, artist name, or album name as search keywords which are distinguished by relevant keyword type for each keyword type.

Therefore, a keyword type selecting key 31 for selecting "genre" as the keyword type (hereafter called genre selecting key), a keyword type selecting key 32 for selecting "artist" as the keyword type (hereafter called artist selecting key), and a keyword type selecting key 33 for selecting "album disk" as the keyword type (hereafter called album selecting key), are provided on one face 5A of the remote controller 5. In this case, the surface of the all composition selection key 30 has no writing thereupon, but on the one face 5A of the remote controller 5, the characters "ALL" are printed near the all composition selection key 30 to indicate "all compositions" as the search criteria. Also, a picture design of a musical note, for example, is drawn on the surface of the genre selecting key 31 to show "genre" as the keyword type, and the characters "GENRE" are printed near the genre selecting key 31 to indicate "genre". Further, a picture design of a person, for example, is drawn on the surface of the artist selecting key 32 to show "artist" as the keyword type, and the characters "ARTIST" are printed near the artist selecting key 32 to indicate "artist" on the one face 5A of the remote controller 5. Furthermore, a picture design of a disc, for example, is drawn on the surface of the album selecting key 33 to show "album disk" as the keyword type, and the characters "DISC" are printed near the album selecting key 33 to indicate "album disk" on the one face 5A of the remote controller 5. Thus, the remote controller 5 can constantly show the user the selectable search criteria or keyword types for searching the composition data, by the picture designs on the all composition selection key 30, genre selecting key 31, artist selecting key 32, and album selecting key 33, and the characters nearby.

Also, the genre selecting key 31 is arranged so as to sequentially select genre name as the search keyword, from a genre list generated corresponding to the composition titles and so forth with genre name being distinguished with "genre" as the keyword type, according to the order of the list. Further, the artist selecting key 32 is arranged so as to sequentially select artist name as the search keyword, from an artist list generated corresponding to the composition titles and so forth with artist name being distinguished with "artist" as the keyword type, according to the order of the list. Furthermore, the album selecting key 33 is arranged so as to sequentially select album name as the search keyword, from a album list generated corresponding to the composition titles and so forth with album name being distinguished with "album disk" as the keyword type, according to the order of the list.

However, in the event that the genre selecting key 31, artist selecting key 32, and album selecting key 33 are pressed by the user as instruction for selecting the search keyword, for example, the remote controller 5 functions so as to switch and select between genre name, artist name, and album name to be selected sequentially along the direction from one end of the genre list, artist list, and album list to the other end thereof. Therefore, apart from the genre selecting key 31, artist selecting key 32, and album selecting key 33 on the one face 5A of the remote controller 5, an other direction keyword selecting key 34 for switching and selecting genre name, artist name, and album name to be sequentially selected in the direction from the other end to the one end of the genre list, artist list, and album list, as well as a one-direction keyword selecting key 35 for switching and selecting the genre name, artist name, and album name to be sequentially selected along the direction from the one end to the other end of the genre list, artist list, and album list, are also provided thereupon.

Incidentally, a playlist call key 36 for the wireless communication module 3 to call up a playback list (hereafter called a playlist) wherein the compositions selected arbitrarily from the server 2 are registered therein during playback processing of the composition data, and a function selection key 37 for selecting a radio program acquiring function for the wireless communication module 3 to acquire a radio program, which is broadcast via a network such as the Internet, via the server 2, are provided on the one face 5A of the remote controller 5. Also, volume adjusting keys 38 and 39 for adjusting the volume of the composition during playback, treble adjusting keys 40 and 41 for adjusting the treble range serving as the sound quality of the composition, bass adjusting keys 42 and 43 for adjusting the bass range of the composition, are provided on the one face 5A of the remote controller 5. Further, a surround-sound key 44 and an equalizer key 45 for adjusting the sound quality of the composition to be on or off are also provided on the one face 5A of the remote controller 5. Thus the remote controller 5 has various types of operational keys provided on the one face 5A thereupon, and when these operational keys are pressed by a user, a command corresponding to the pressed operational key is emitted as an infrared signal from an infrared emitting portion (not shown) towards the wireless communication module 3. Thus the remote controller 5 is arranged so as to input various types of commands to the wireless communication module 3, according to the pressing operation of the operational keys by the user.

Figure 4:
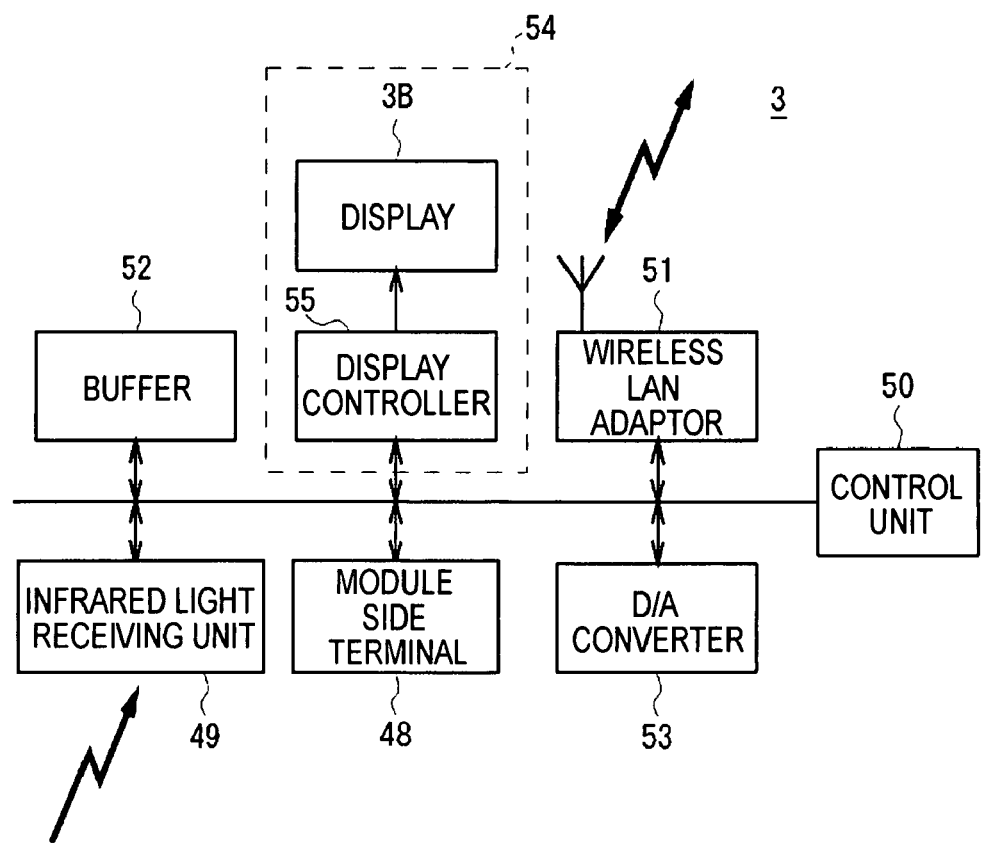
FIG. 4 is a block diagram illustrating the circuit configuration of a wireless communication module.

Next, the circuit configuration of the wireless communication module 3 will be described with reference to FIG. 4. When the wireless communication module 3 is mounted on the cradle 4, the entire unit becomes operable by acquiring power supplied from the cradle 4 via the module side terminal 48. Also, an infrared light receiving unit 49 on the wireless communication module 3 receives various commands as infrared signals such as a startup command according to the user pressing the operational keys such as the power on/off key 10 and so forth, emitted from the remote controller 5, and converts the infrared signal to various commands such as a startup command, and transmits these commands to a control unit 50 of a microcomputer configuration, for example. The control unit 50 executes various programs such as a search keyword input program read out from an internal memory (not shown) in the control unit 50, according to the various commands given from the infrared light receiving unit 49, and thus controls the entire unit overall, as well as executes various processing.

Thus, when the wireless communication module 3 is started in the state of being mounted on the cradle 4, for example, the control unit 50 transmits a server search signal (for example, M-SEARCH command) from the wireless LAN adapter 51, using a protocol called SSDP (simple Service Discovery Protocol), while using an arrangement such as UPnP (Universal Plug & play) of TCP/IP (Transmission Control Protocol/Internet Protocol) base, or DLNA (Digital Living Network Alliance) as an initialization setting processing. As a result, when the control unit 50 receives the reply signal replied from the server 2 having received the server search signal, via the wireless LAN adapter 51, the control unit 50 detects that there is a server 2 wirelessly communicable with a wireless communication module 3. Also, when the control unit 50 thus detects the server 2 with wireless communication capability, the control unit 50 transmits a server information request signal from the wireless LAN adapter 51. As a result, when the control unit 50 receives the server information (for example, Device Description) replied from the server 2 according to the reception of the server information request signal, via the wireless LAN adapter 51, the control unit 50 determines whether or not the server 2 with wireless communication capability is capable of providing composition data as to the wireless communication module 3, based on the content of the received server information, and also determines whether or not the server 2 has been manufactured corresponding to the wireless communication module 3.

Figure 5:
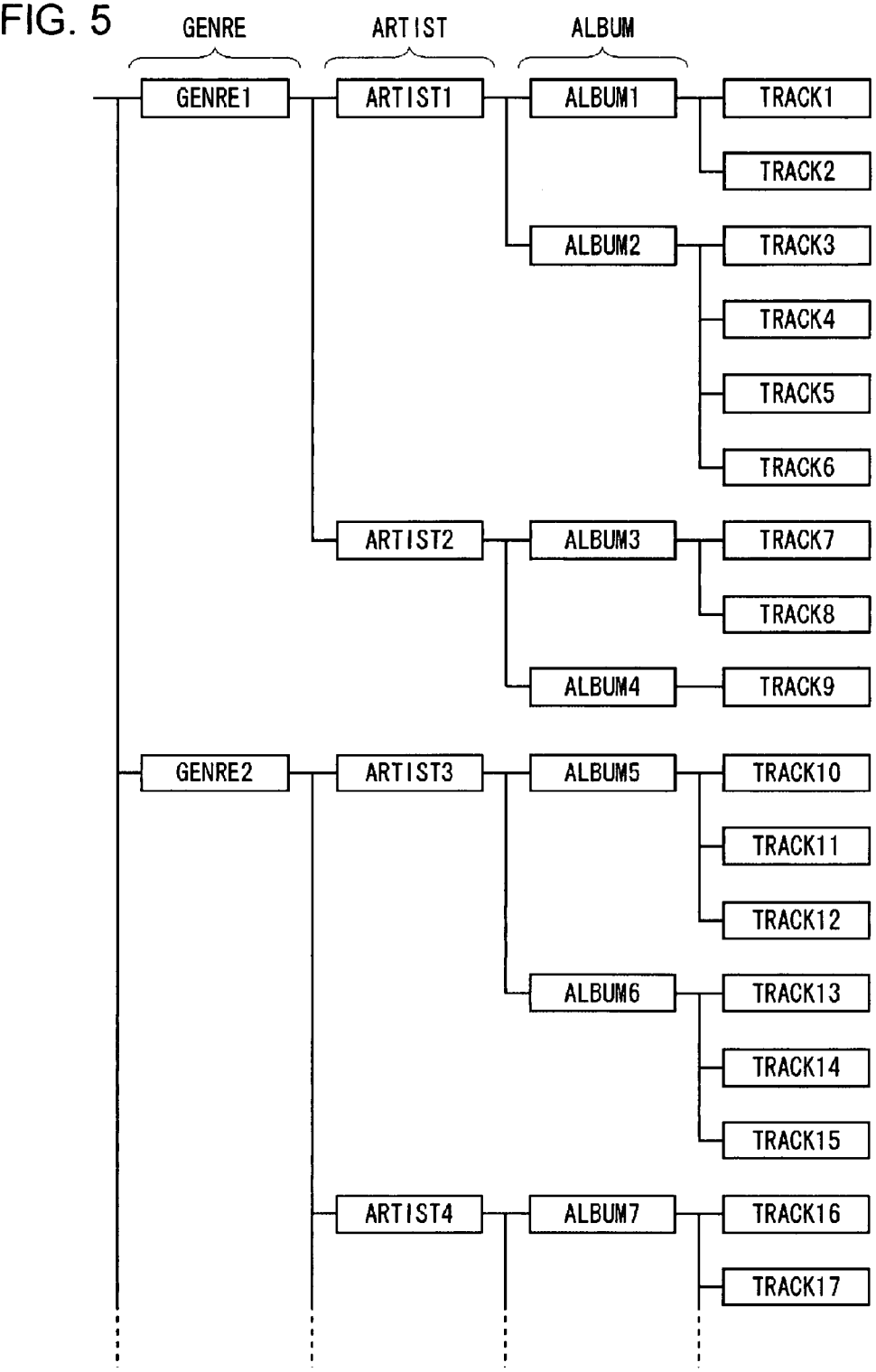
FIG. 5 is a schematic diagram describing management of a multi-level hierarchical configuration of composition data by a server.
Figure 6:
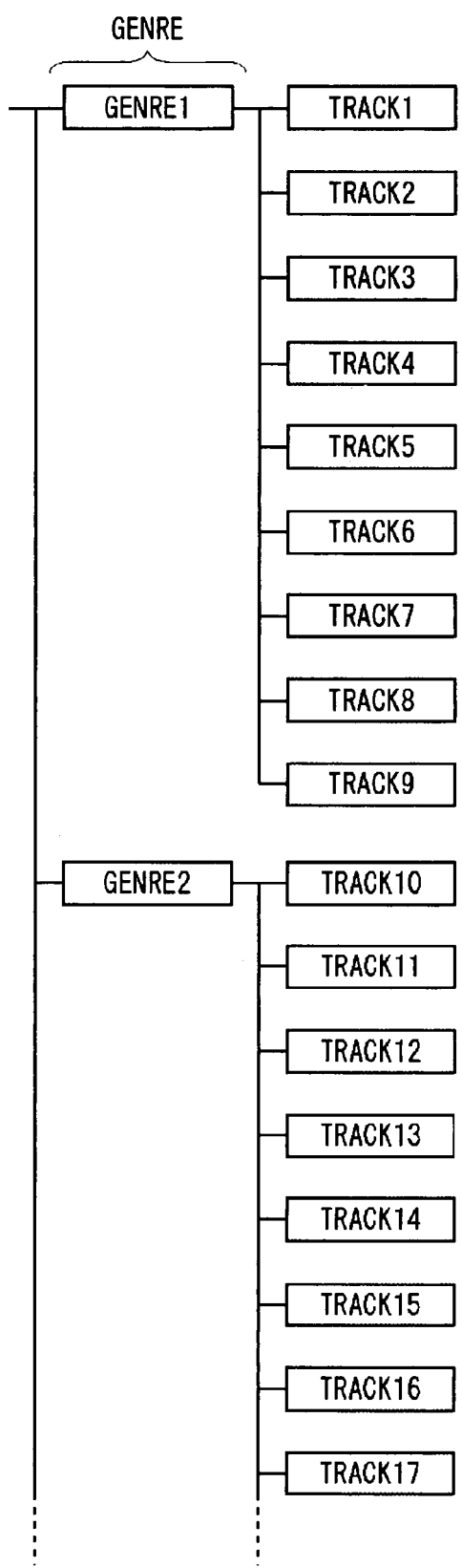
FIG. 6 is a schematic diagram describing a two-level configuration of genre and composition data.
Figure 7:
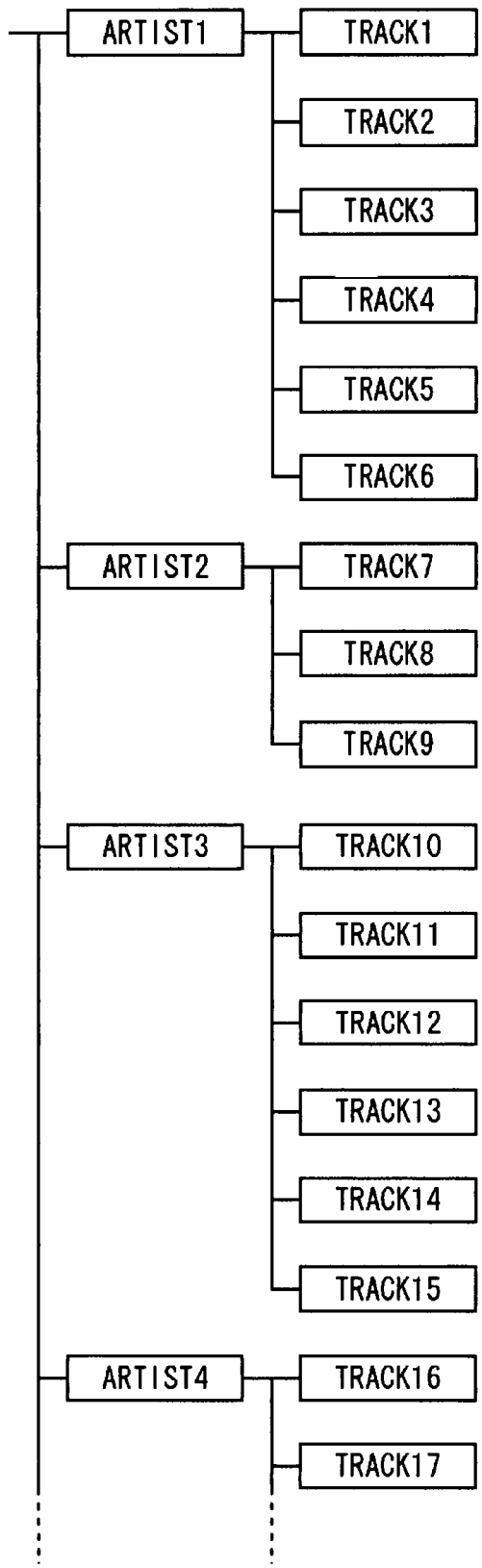
FIG. 7 is a schematic diagram describing a two-level configuration of artist and composition data.
Figure 8:
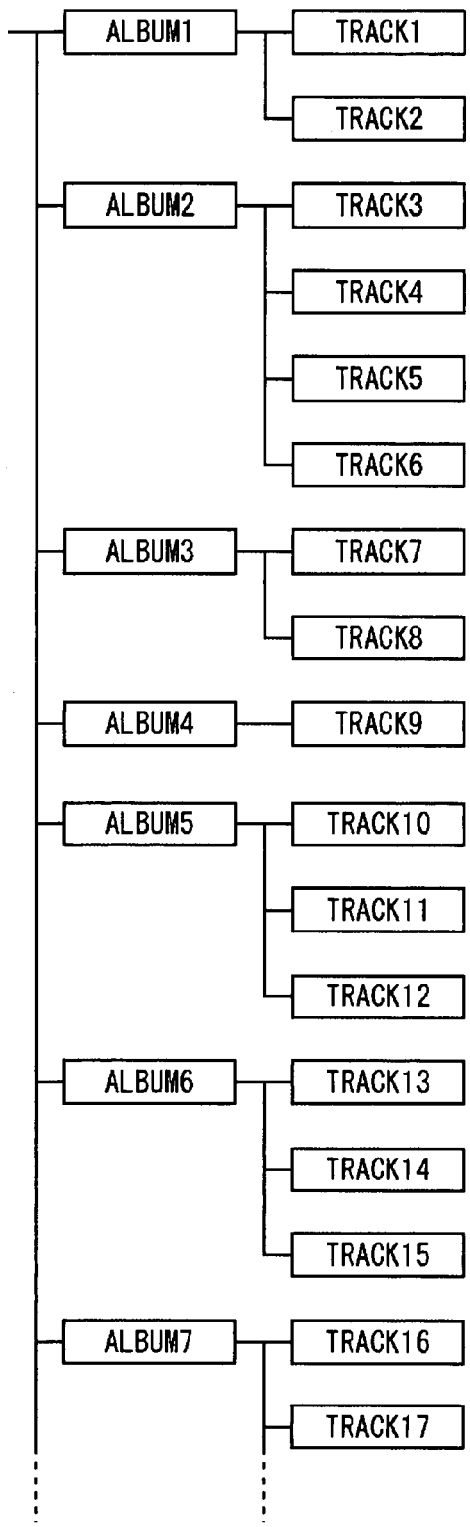
FIG. 8 is a schematic diagram describing a two-level configuration of album disk and composition data.
Figure 9:
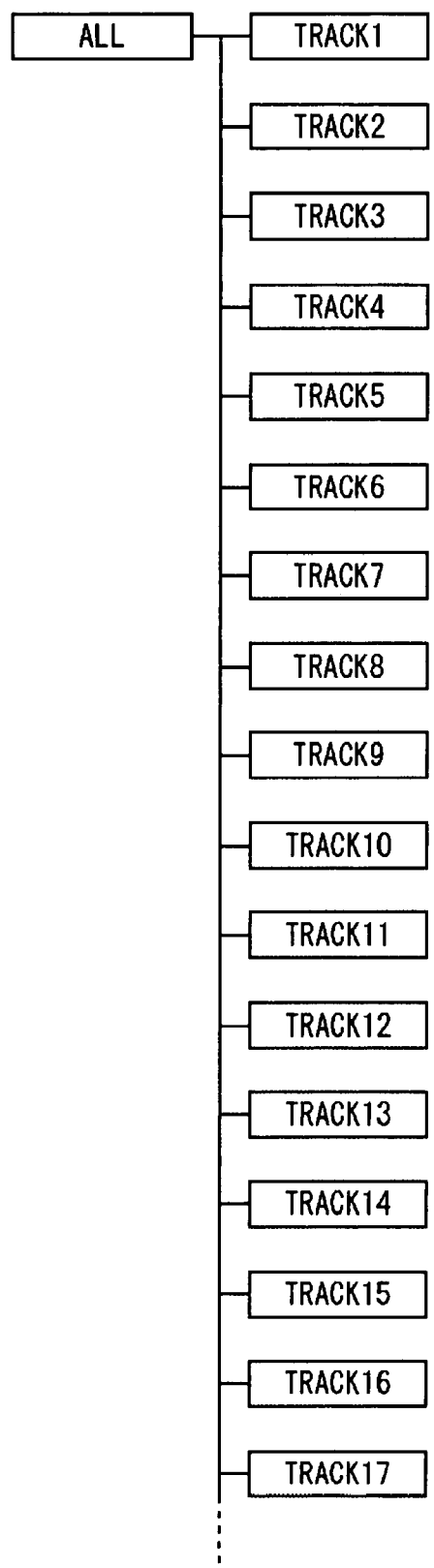
FIG. 9 is a schematic diagram describing a two-level configuration of all compositions of search criteria and the composition data.

As shown in FIG. 5, the server 2 manages the large amount of composition data stored within itself, as described above, with a multi-level hierarchical configuration wherein the composition data corresponds to the genre name, artist name, and album name hierarchically, distinguished by the types "genre", "artist", and "album disk". In other words, the server 2 is arranged so that the genre name distinguished by "genre" is the highest hierarchical level, the artist name distinguished by "artist" is one hierarchical level lower than genre name, and the album name distinguished by "album disk" is one hierarchical level lower than album name (that is to say, in this case is the lowest hierarchical level). Then the server 2 correlates the artist name of the compositions belonging to each genre, with each individual genre name, and also correlates the album name of the album disks wherein the compositions performed by each artist are stored, with each individual artist name, and correlates the composition data (in other words, the tracks in the diagram) of the compositions stored on each album disk with these album names. As shown in FIGS. 6 through 8 in this situation, the server 2 which is manufactured in a manner correlated with the wireless communication module 3 is arranged so as to be able to generate two-level information directly correlating each of the composition data with each of the types (that is to say, "genre", "artist", and "album disk"), from information of a multi-level hierarchical configuration for managing composition data as shown in FIG. 5. Also, as shown in FIG. 9, the server 2 is arranged to be able to generate two-level hierarchical information directly correlating to all of the composition data with the search criteria of "all compositions", from information of a multi-level hierarchical configuration for managing the composition data shown in FIG. 5.

Figure 12:
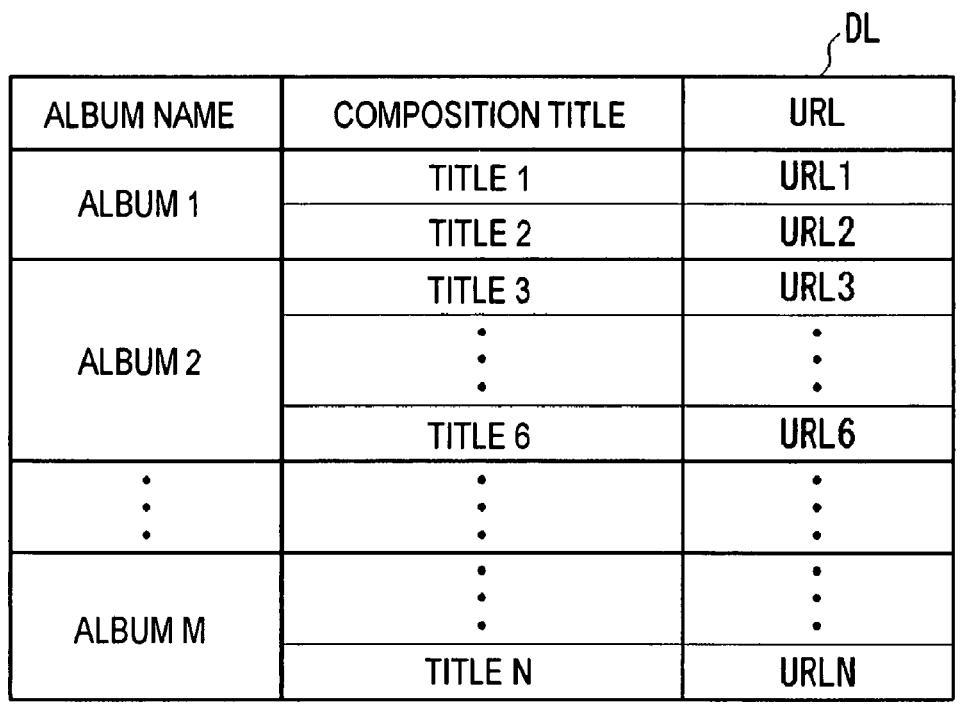
FIG. 12 is a schematic diagram illustrating an album list configuration.

As shown in FIG. 10, the server 2 is arranged to be able to generate a genre list JL, correlating the composition title of the composition belonging to each genre and the URL (Uniform Resource Locator) used in the event of requesting the composition data of this composition with the individual genre names, based on the two-level hierarchical information regarding "genre" and composition data. Also as shown in FIG. 11, the server 2 is arranged to be able to generate an artist list RL, correlating the composition title of the composition performed by each artist and the URL used in the event of requesting the composition data of this composition with the individual artist names, based on the two-level hierarchical information regarding "artist" and composition data. Also as shown in FIG. 12, the server 2 is arranged to be able to generate a album list DL, correlating the composition title of the composition stored on each album disk and the URL used in the event of requesting the composition data of this composition with the individual album names, based on the two-level hierarchical information regarding "album disk" and composition data. Also as shown in FIG. 13, the server 2 is arranged to be able to generate an all compositions list AL which includes a URL used in the event of requesting the composition data and the composition titles of all of the composition data, based on the two-level hierarchical information regarding the search criteria "all compositions" and composition data.

Therefore, in the event that the control unit 50 detects the server 2 which can provide the composition data, if this server 2 is manufactured to correspond with the wireless communication module 3, a list request signal for requesting a genre list JL, artist list RL, and album list DL (hereafter together called type lists) and an all composition list AL is transmitted from the wireless LAN adapter 51, using a protocol called SOAP (Simple Object Access Protocol), by using a Contents Delivery Service provided by the server 2, for example. As a result, when the type lists and the all composition list AL are transmitted from the server 2, the control unit 50 receives these via the wireless LAN adapter 51 and stores these in internal memory (not shown).

On the other hand, if the server 2 is not manufactured to correspond with the wireless communication module 3, even if the large amount of composition data stored within itself is managed with a multi-level hierarchical configuration, the server 2 is not configured to be able to generate the type lists or the all composition list AL. Therefore, if the server 2 which can provide composition data is not manufactured to correspond to the wireless communication module 3, for example as described above, the Contents Delivery Service provided by the server 2 is used, and a hierarchical configuration information request signal is transmitted to request information regarding the multi-level hierarchical configuration managing all of the composition data (hereafter called hierarchical configuration information) from the wireless LAN adapter 51, using the SOAP. As a result, when the hierarchical configuration information is replied from the server 2, the control unit 50 receives this via the wireless LAN adapter 51. Then the control unit 50 generates the type lists (that is to say, the genre list JL, artist list RL, and album list DL), as well as the all composition list AL, based on the hierarchical configuration information received, and stores the generated type lists and all composition list AL in internal memory. Thus the control list 50 acquires the type lists and all-composition list AL to be used in composition data searches to be described later, during initialization setting processing.

After completing the initialization setting processing, when a composition data acquiring command is input according to the user pressing the function selection key 12 on the remote controller 5, the control unit 50 changes to the composition data acquiring mode which realizes the composition data acquiring function. While in the composition data acquiring mode, for example if an all composition selection command is input according to the user pressing the all compositions selection key 30 on the remote controller 5, the control unit 50 detects that "all compositions" is selected by the user as the search criteria for the composition data. Then based on the search criteria called "all compositions" selected by the user, the control unit 50 reads the all composition list AL from the internal memory. If while in this state, for example, the playback start key 17 on the remote controller 5 is pressed by the user, and accordingly a playback start command is input, the control unit 50 transmits a composition data request signal for requesting composition data according to the URL (Uniform Resource Locator) for requesting composition data included in the all compositions list AL from the wireless LAN adapter 51, using HTTP (Hyper Text Transfer Protocol) called Media Transport, for example.

Also, while in the composition data acquiring mode, one of the genre selection key 31, artist selection key 32, or album selection key 33 of the remote controller 5 is pressed by the user as instructions to select the keyword type, and in response to this, a genre selecting command, artist selecting command, or album selecting command is input, the control unit 50 detects the keyword type (that is to say, "genre", "artist", or "album disk") selected by the user according to the command thereof. Then the control unit 50 reads out the type list (that is to say, genre list JL, artist list RL, or album list DL) corresponding to the internal memory according to the determined keyword type, and also automatically selects the first genre name, artist name, or album name on the list, for example, from the multiple genre names, artist names, or album names, as the search keyword within the type list. However, when the user again presses the same genre selecting key 31, artist selecting key 32, or album selecting key 33, or presses the other direction keyword selecting key 34 and/or the one-direction keyword selecting key 35, and thus a selection switching command is input to switch the genre name, artist name, or album name to be selected, the control unit 50 switches the genre name, artist name, or album name as the search keyword to be selected within the type list.

Then, when a selection finalizing command is input according to the user pressing the enter key 28 on the remote controller 5, the control unit 50 sets the genre name, artist name, or album name as search keywords which the user has selected at that point as search criteria. Thus the control unit 50 searches the composition title corresponding to the search keyword serving as search criteria from the type list, as the composition title of the composition data to be played. As a result, the control unit 50 extracts the portions relating to the composition title searched by the search keyword from the type list (that is to say, the composition title, and the correlated genre name, artist name, or album name, and the URL for requesting composition data) as the composition request list. If while in this state, for example, the playback start key 17 on the remote controller 5 is pressed by the user, and accordingly a playback start command is input, the control unit 50 transmits a composition data request signal for requesting composition data according to the URL for requesting composition data included in the applicable composition request list from the wireless LAN adapter 51, as with that described above.

Note that the genre name, artist name, and album name serving as search keywords are correlated hierarchically. Therefore in the event that the user searches the composition data, after the search keyword is selected along with the keyword type for distinguishing the higher-level search keyword (hereafter called the higher-level keyword type), when the search keyword is selected along with the keyword type for distinguishing the lower-level search keyword (hereafter called the lower-level keyword type), the desired composition data can be easily narrowed down and searched from a large amount of composition data. Therefore the control unit 50 is arranged to allow the user to select starting at a higher level of multiple keyword types down to a lower levels, hierarchically.

In other words, while in a composition data acquiring mode, if the genre selecting key 31 or artist selecting key 32 is pressed by the user, the control unit 50 determines the higher-level keyword types selected by the user. Then according to the keyword types selected by the user, the control unit 50 reads out the corresponding type list (that is to say, genre list JL or artist list RL) from the internal memory thereof, and automatically selects the first genre name or artist name in the list for example, from the multiple genre names or artist names, as the search keyword within the type list. However, in this case also, when the user again presses the same genre selecting key 31 or artist selecting key 32, or presses the other direction keyword selecting key 34 and/or the one-direction keyword selecting key 35, the control unit 50 accordingly switches the genre name or artist name as the search keyword to be selected within the type list.

While in this state, if the user further presses the artist selecting key 32 or the album selecting key 33, with the higher-level keyword type at that point (that is to say, "genre" or "artist"), the control unit 50 automatically sets the genre name or artist name serving as the search keyword selected by the user as the search criteria. Also the control unit 50 determines the lower-level keyword type (that is to say, a keyword type of a lower level than the previously selected higher-level keyword type) selected additionally by the user, according to the artist selecting key 32 or the album selecting key 33 pressed additionally by the user. If the server 2 which is communicating wirelessly at this time has been manufactured to correspond to the wireless communication module 3, the control unit 50 generates a partial list request signal for requesting a portion directly corresponding to the search keyword serving as the search criteria with the higher-level keyword type (that is to say, genre name or artist name, which hereafter will be called higher-level search keywords), within the type list (that is to say, the artist list RL or album list DL) corresponding to the lower-level keyword type selected by the user. Thus, the control unit 50 transmits this partial list request signal from the wireless LAN adapter 51 using a protocol called SOAP, by using the Contents Delivery Service provided by the server 2, for example.

Figure 14A:
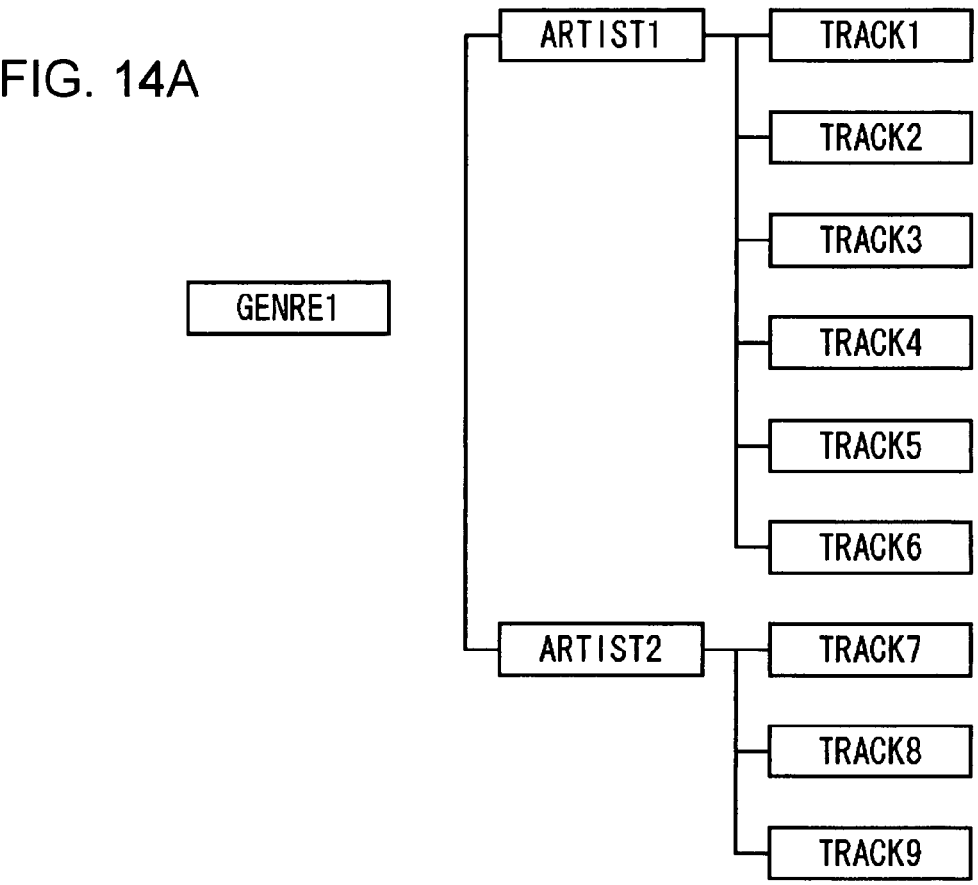
FIG. 14 is a schematic diagram describing a partial two-level configuration.
Figure 14B:
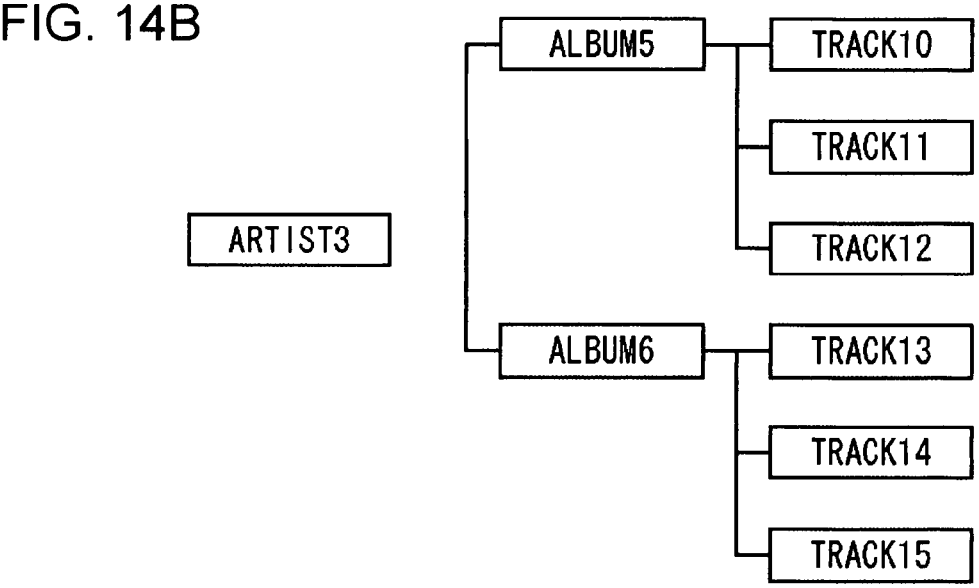

In the event that a server 2, which is manufactured to correspond to the wireless communication module 3, receives this partial list request signal, the server 2 is arranged to be able to generate information regarding the multi-level hierarchical configuration for the composition data management as described above with reference to FIG. 5, information regarding a partial two-level configuration of an artist name and composition data directly correlated to a genre name, for example, serving as the highest-level search keyword selected by the user, as shown in FIGS. 14A and 14B, for example, or information regarding a partial two-level hierarchical configuration of an album name and composition data directly correlated to an artist name, for example, serving as the highest-level search keyword selected by the user. Then as shown in FIGS. 15A and 15B, the server 2 is arranged to be able to generate an artist partial list RPL, which correlates the URL for requesting composition titles and composition data with the individual artist names directly correlated with the genre name serving as the highest-level search keyword, or an album partial list DPL, which correlates the URL for requesting composition titles and composition data with the individual album names directly correlated with to the artist name serving as the highest-level search keyword, as type partial lists based on the partial two-level information, and reply with this information to the wireless communication module 3.

Accordingly, when the control unit 5 transmits the partial list request signal to the server 2, the control unit 50 receives the type partial list replied back from the server 2 via the wireless LAN adapter 51 and temporarily stores this in an internal memory. Note that if the server 2 which is communicating wirelessly at this time is not manufactured to correspond to the wireless communication module 3, the control unit 50 generates a type partial list (that is to say, the artist partial list RPL or album partial list DPL) based on the hierarchical configuration information acquired from the server 2, and temporarily stores this in the internal memory. When the control unit 50 thus acquires the type partial list, the control unit 50 automatically selects the first artist name or album name of the list from the multiple artist names or album names as the search keyword within the type partial list, for example. However, in this case also, when the user presses the artist selecting key 32 or album selecting key 33, or presses the other direction keyword selecting key 34 and/or the one-direction keyword selecting key 35, the control unit 50 accordingly switches the artist name or album name as the search keyword to be selected within the type partial list.

When the enter key 28 on the remote controller 5 is pressed by the user, the control unit 50 accordingly sets the artist name or album name as search criteria serving as the search keywords selected by the user from the type partial list at that point in time. Thus the control unit 50 searches the composition title corresponding to the search keyword serving as the search criteria from the type partial list, as the composition title of the composition data to be played. As a result, the control unit 50 extracts the portions relating to the composition title searched by the search keyword from the type partial list (that is to say, the composition title, and the corresponding artist name or album name, and the URL for requesting composition data) as the composition request list. If while in this state, for example, the playback start key 17 on the remote controller 5 is pressed by the user, and accordingly a playback start command is input, the control unit 50 transmits a composition data request signal according to the URL for requesting composition data included in the applicable composition request list from the wireless LAN adapter 51, as with that described above.

As a result of the transmission of the composition data request signal, when transmission of the composition data is started in a linear PCM (Pulse Code Modulation) format from the server 2 for example, the control unit 50 (FIG. 4) receives this composition data via the wireless LAN adapter 51 and writes into the buffer 52 in the order of the portion wherein the composition data has finished being received. When composition data worth several seconds, for example, is stored in the buffer 52, the control unit 50 transmits this stored composition data to a digital analog converter (hereafter called D/A converter) 53, and also deletes this data from the buffer 52 and awaits several seconds worth of composition to be stored in the buffer 52 again. The D/A converter 53 performs digital-analog converting processing as to the composition data provided from the buffer 52, and transfers the resulting composition signal from the module side terminal 48 to the cradle 4. Thus the control unit 50 performs playback processing and transfers the composition data transmitted from the server 2 in a streaming format to the cradle 4 as a composition signal, and thus outputs the composition based on the composition signal from the speakers built into the cradle 4.

Incidentally, when a favorites list call command or playlist call command is input by the user pressing the favorites list call key 13 or playlist call key 36 on the remote controller 5, the control unit 50 transmits a favorite list request signal or playlist request signal to the server 2 from the wireless LAN adapter 51, for example. As a result, when the server 2 transmits the favorites list or playlist, the control unit 50 receives this via the wireless LAN adapter 51 and records this to internal memory. Then when the playback start key 17 on the remote controller 5 is pressed by the user in this state, the control unit 50 transmits a composition data request signal according to the URL for requesting composition data included in the favorites list or the playlist. Thus, as with the case wherein the composition data is subjected to playback processing in a streaming format using the above-described composition request list, the control unit 50 subjects the composition data registered in the favorites list or playlist to playback processing in a streaming format, and outputs the composition from the speakers in the cradle 4. Note that when the composition registration key 14 on the remote controller 5 is pressed during the composition data being subjected to playback processing in a streaming format using the composition request list or playlist (that is to say, while the composition is being output from the speakers in the cradle 4 and the user is listening), the control unit 50 transmits a composition registration request signal from the wireless LAN adapter 51 to the server 2 so as to register the composition based on the composition data being subjected to playback processing at that point in time into the favorites list. Thus the control unit 50 registers the composition favored by the user as to the favorites list in the server 2. Also, if the registration delete key 15 on the remote controller 5 is pressed by the user during the composition data being subjected to playback processing in a streaming format using the favorites list, the control unit 50 deletes the registration of the composition is deleted from the favorites list based on the composition data being subjected to playback processing at that point in time.

Note that, when a temporary stop command or a playback stop command is input according to the temporary stop key 18 or the playback stop key 19 on the remote controller 5 being pressed by the user during the composition data being subjected to playback processing in a streaming format, the control unit 50 transmits a temporary stop signal or a playback stop signal from the wireless LAN adapter 51 to the server 2. Thus the control unit 50 temporarily stops or completely stops the transmission of composition data to the server 2. Also, if a fast-forward command or a fast-rewind command is input according to the user pressing the fast-forward key 20 or fast-rewind key 21 on the remote controller 5, the control unit 50 transmits a signal indicating a fast-forward command or a fast-rewind command from the wireless adapter 51 to the server 2. Thus, the control unit 50 controls the server 2 so as to transmit the composition data by thinning out the composition data to the tail end of the data, or by thinning out the composition data to go back to the beginning of the data, and thus realizes fast-forwarding or fast-rewinding of the composition. Further, when a next track command or a previous track command is input according to the user pressing the next track key 22 or the previous track key 23 of the remote controller 5, the control unit 50 changes the URL for requesting the composition data according to the composition request list, favorites list, or playlist, and transmits the composition data request signal according to the changed URL. Thus, the control unit 50 changes the composition data to be transmitted to the server 2, and realizes the skipping of tracks to the next track or previous track composition.

Further, if a one-song repeat playback selection command is input according to the user pressing the repeat playback mode selection key 25 on the remote controller 5 during playback processing in a streaming format of the composition data, the control unit 50 recognizes the composition data being subjected to playback processing at that point in time as the composition data to be subjected to repeated playback processing based on the one-song repeat playback mode. Then as the playback processing of this composition data in a streaming format is finished as to each applicable composition data, the control unit 50 transmits a composition data request signal requesting this composition data from the wireless LAN adapter 51. Thus, in the event that the one-song repeat playback mode is selected by the user as a composition playback mode, the control unit 50 repeatedly outputs the one composition selected by the user from the speakers in the cradle 4. Also, when a multiple repeat playback selection command is input according to the user pressing the repeat playback mode selection key 25 of the remote controller 5, when multiple composition data are finished playing all the way through in a streaming format using a composition request list, favorites list, or playlist, the composition data is requested using the same composition request list, favorites list, or playlist, to be subjected to playback processing in a streaming format. Thus, in the event that the multiple repeat playback mode is selected by the user as the composition playback mode, the control unit 50 continuously selects the same composition request list, favorites list, or playlist, and cyclically repeatedly outputs the multiple compositions registered in the composition request list, favorites list, or playlist from the speakers in the cradle 4.

Further, when a normal playback command is input according to the user pressing the playback mode selection key 26 on the remote controller 5 at the time of subjecting the composition data to playback processing in a streaming format, the control unit 50 transmits the URL for requesting the composition data included in the composition request list, favorites list, or playlist, as a composition data request signal using the order of compositions included in the composition request list, favorites list, or playlist. Thus, when the normal playback mode is selected by the user as the composition playback mode, the control unit 50 outputs the multiple compositions registered in the composition request list, favorites list, or playlist sequentially as registered from the speakers in the cradle 4. Conversely, when an order-change playback command is input according to the user pressing the playback mode selection key 26 on the remote controller 5 at the time of subjecting the composition data to playback processing in a streaming format, the control unit 50 transmits the URL for requesting the composition data included in the composition request list, favorites list, or playlist, as a composition data request signal using an order of compositions arbitrarily changed from the order included in the composition request list, favorites list, or playlist. Thus, when the order-change playback mode is selected by the user as the composition playback mode, the control unit 50 outputs the multiple compositions registered in the composition request list, favorites list, or playlist in an order arbitrarily changed from the registered order, from the speakers in the cradle 4.

Additionally, when a distribution data acquiring command is input according to the user pressing the function selection key 12 on the remote controller 5, the control unit 50 transitions to a distribution data acquiring mode for realizing the distribution data acquiring function. When the control unit 50 transitions to the distribution data acquiring mode, the control unit 50 transmits a distribution data request signal from the wireless LAN adapter 51 to the server 2. As a result, when the composition data distributed on the network is transmitted via the server 2, the control unit 50 receives this via the wireless LAN adapter 51, and as with the above described composition data acquiring mode situation, subjects the applicable composition data to playback processing in a streaming format, and transfers the obtained composition signal to the cradle 4. In the event that the user thus requests that a distribution data acquiring function is realized, the control unit 50 can output the composition data distributed on the network as a composition from the speakers of the cradle 4, and allow the user to listen thereto. Also, when a radio program acquiring command is input by the user pressing the function selection key 37 on the remote controller 5, the control unit 50 transitions to a radio program acquiring mode for realizing a radio program acquiring function. When the control unit 50 transitions to the radio program acquiring mode, the control unit 50 transmits the radio program request signal from the wireless LAN adapter 51 to the server 2. As a result, when the program audio data of the radio program which is broadcast via the network is transmitted via the server 2, the control unit 50 receives this via the wireless LAN adapter 51, and as with the above-described composition data acquiring mode situation, subjects the applicable program audio data in a streaming format to playback processing, and transfers the obtained program audio signal to the cradle 4. In the event that the user thus requests that a radio program acquiring function is realized, the control unit 50 can output the program audio data of the radio program broadcast via the network as program audio from a radio program from the speakers of the cradle 4, and allow the user to listen thereto.

When a volume adjusting amount and volume adjusting command are input according to the user pressing the volume adjusting keys 38 and 39 on the remote controller 5, the control unit 50 generates a volume adjusting control signal according to the applicable volume adjusting amount, and transfers this from the module side terminal 48 to the cradle 4. Thus the control unit 50 adjusts the volume as to the composition or program audio of a radio program with the cradle 4. Also, when a surround-sound-on command or equalizing-on command is input according to the user pressing the surround-sound key 44 or the equalizer key 45 on the remote controller 5, the control unit 50 transfers a surround-sound quality control signal for controlling the sound quality selected beforehand for surround-sound, or an equalizing sound quality control signal for controlling the sound quality selected beforehand for equalizing, from the module side terminal 48 to the cradle 4. Thus the control unit 50 adjusts the composition or program audio of a radio program to a sound quality selected beforehand for surround-sound or for equalizing with the cradle 4. While in this state, if a treble range adjusting amount and treble range adjusting command or a bass range adjusting amount and bass range adjusting command are input according to the user pressing the treble range adjusting keys 40 and 41 or the bass range adjusting keys 42 and 43 on the remote controller 5, the control unit 50 generates a treble range adjusting control signal according to the applicable treble range adjusting amount or a bass range adjusting control signal according to the applicable bass range adjusting amount, and transfers this from the module side terminal 48 to the cradle 4. Thus the control unit 50 makes adjustments as to the treble range or bass range of the composition or program audio of a radio program with the cradle 4, based on the sound quality selected beforehand for surround-sound, or the sound quality selected beforehand for equalizing.

The control unit 50 can thus allow the user to listen to the compositions based on composition data or the program audio based on program audio data of a radio program in various situations. In the case that the control unit 50 allows the user to listen to the compositions or the program audio of radio programs along with the server 2 and cradle 4, display elements to be described later (hereafter called icons) or characters and so forth are displayed on the display 3B via the display controller 55 on the display unit 54. Thus the control unit 50 is arranged to be able to allow the user to visually confirm the functions in the realization process or the information selected by the user from the display content on the display 3B.

Figure 16:
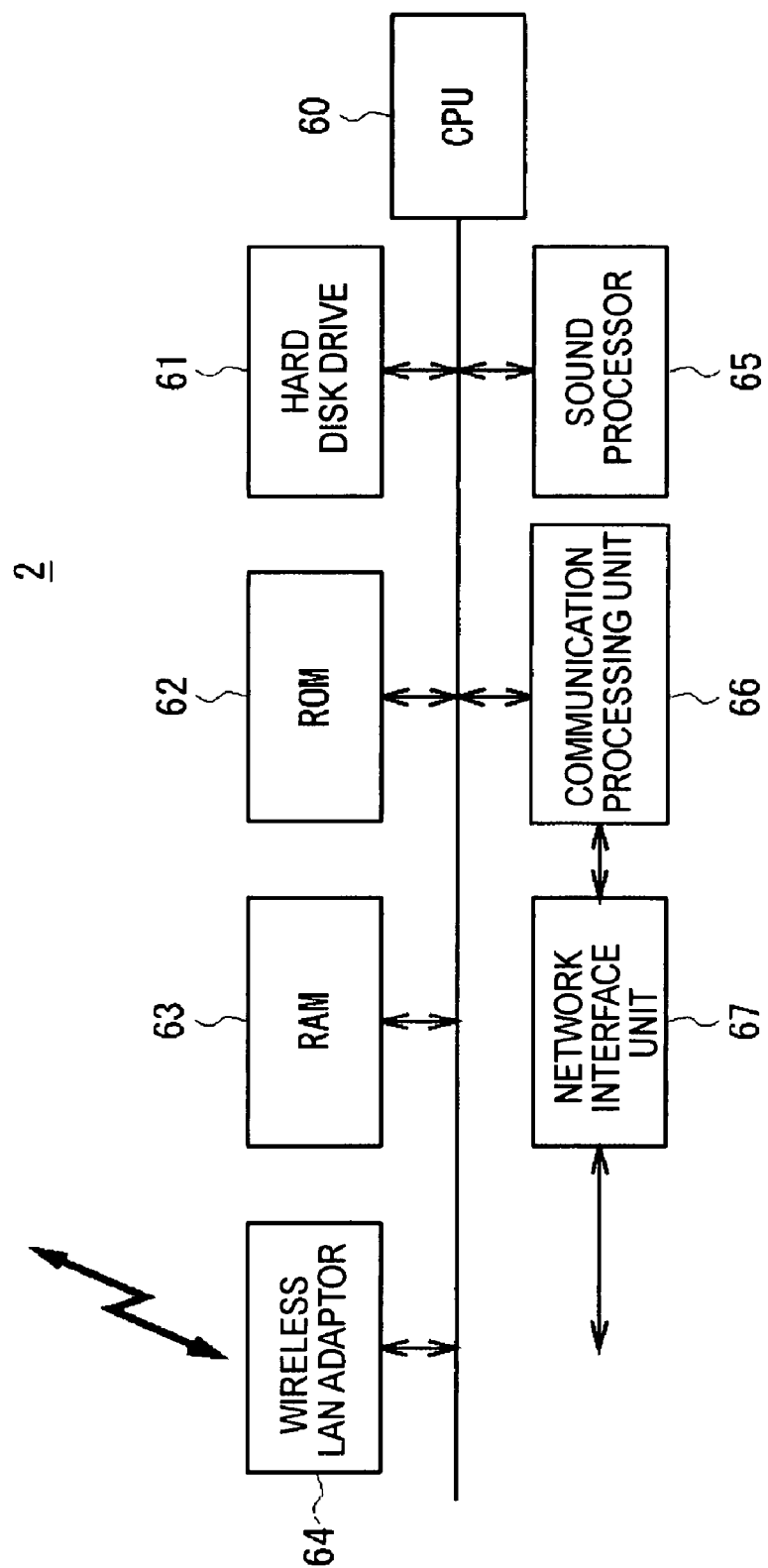
FIG. 16 is a block diagram illustrating the circuit configuration of a server.

Next, the circuit configuration of the server 2 will be described with reference to FIG. 16. The server 2 expands and executes various programs with RAM (Random Access Memory) 63 which a CPU (Central Processing Unit) 60 has read from a hard disk drive 61 or ROM (Read Only Memory) 62, thus controlling the entire unit overall and executing the various processing. Thus, the central processing unit 60 is arranged to be able to communicate wirelessly with the wireless communication module 3 via a wireless LAN adapter 64, with a wireless LAN standard the same as that of the wireless communication module 3. Also the central processing unit 60 compresses to encode and stores multiple composition data on the hard disk drive 61 for example as compressed composition data, and also stores various data such as composition related information, a favorites list, a playlist, and so forth. Also the central processing unit 60 manages the large amount of composition data stored on the hard disk drive 61 in a multi-level hierarchical configuration with types such as "genre", "artist" and "album disk", as described above with reference to FIG. 5.

While in this state, if the central processing unit 60 receives a server search signal transmitted from the wireless communication module 3 via the wireless LAN adapter 64, the central processing unit 60 replies accordingly with a reply signal from the wireless LAN adapter 64 to the wireless communication module 3. Also, if the central processing unit 60 receives a server search signal transmitted from the wireless communication module 3 via the wireless LAN adapter 64, the central processing unit 60 replies accordingly with server information relating to the server 2 itself from the wireless LAN adapter 64 to the wireless communication module 3. Now, if the server 2 of the central processing unit 60 itself has been manufactured to correspond to the wireless communication module 3, the central processing unit 60 then receives a list request signal transmitted from the wireless communication module 3, via the wireless LAN adapter 64. Thus the central processing unit 60 generates a type list (that is to say, a genre list JL, artist list RL, and album list DL) and an all compositions list AL as described above with reference to FIGS. 6 through 13, and transmits these from the wireless LAN adapter 64 to the wireless communication module 3. Also, when the central processing unit 60 receives the partial list request signal via the wireless LAN adapter 64 which is transmitted from the wireless module 3, the central processing unit 60 accordingly generates an artist partial list RPL or album partial list DPL as described above with reference to FIGS. 14 and 15, and transmits these from the wireless LAN adapter 64 to the wireless communication module 3. On the other hand, if the server 2 of the central processing unit 60 itself has not been manufactured to correspond to the wireless communication module 3, the central processing unit 60 receives a hierarchical configuration information request signal transmitted from the wireless communication module 3, via the wireless LAN adapter 64. Thus the central processing unit 60 transmits the hierarchical configuration information for managing all of the compressed composition data (that is to say, the composition data) stored on the hard disk drive 61, from the wireless LAN adapter 64 to the wireless communication module 3.

When the central processing unit 60 receives the composition data request signal which is transmitted from the wireless communication module 3 via the wireless LAN adapter 64, the central processing unit 60 reads the compressed composition data specified by this composition data request signal from the hard disk drive 61, and transfers this to a sound processor 65. The sound processor 65 performs digital processing such as decoding processing as to the compressed composition data provided by the central processing unit 60, and transmits the composition data in a linear PCM format which is obtained as a result thereof from the wireless LAN adapter 64 to the wireless communication module 3. Thus the central processing unit 60 is enabled to wirelessly transmit the large amount of composition data stored on the hard disk drive 61 to the wireless communication module 3.

Incidentally, when the central processing unit 60 receives the distribution data request signal transmitted from the wireless communication module 3 via the wireless LAN adapter 64, the central processing unit 60 accesses a distribution server on the network via a communication processing unit 66 and a network interface unit 67 sequentially to request the composition data. As a result, the central processing unit 60 receives the compressed composition data transmitted from the applicable distribution server via the network interface unit 67 and communication processing unit 66 sequentially, and also transmits the received compressed composition data via the sound processor 65 as composition data in a linear PCM format from the wireless LAN adapter 64 to the wireless communication module 3. Also, when the central processing unit 60 receives a radio program request signal transmitted from the wireless communication module 3 via the wireless LAN adapter 64, the central processing unit 60 receives the program audio data of the radio program being broadcast via the network, via the network interface unit 67 and the communication processing unit 66 sequentially, and transmits the program audio data from the wireless LAN adapter 64 to the wireless communication module 3 via the sound processor 65.

Figure 17:
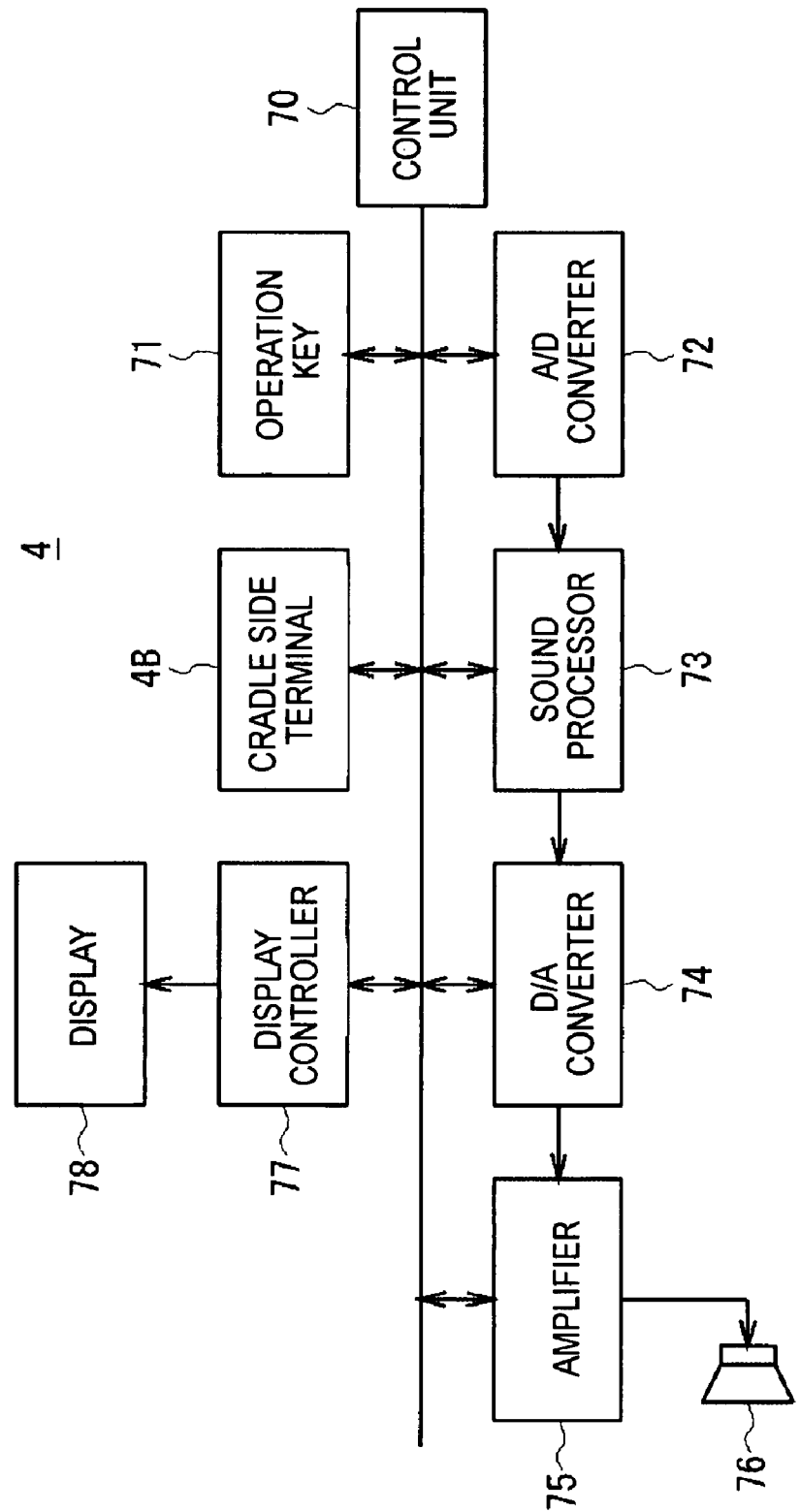
FIG. 17 is a block diagram illustrating the circuit configuration of a cradle.

Next, the circuit configuration of the cradle 4 will be described with reference to FIG. 17. The cradle 4 is operated by a power source supplied via an unshown AC (alternating current) adapter. For example a control unit 70 with a microcomputer configuration controls the entire unit overall by executing various programs read from internal memory (not shown), according to various commands input via the operation key 71 or various control signal provided from the wireless communication module 3. Thus, when the wireless communication module 3 is mounted on the mounting portion 4A in the state wherein the entire cradle 4 is started, the control unit 70 supplies power to the wireless communication module 3 from the cradle side terminal 4B. Also, when a composition signal or program audio signal is transmitted from the wireless communication module 3, the control unit 70 acquires the composition signal or program audio signal and transfers this to an analog digital converter (hereafter called A/D converter) via the cradle side terminal 4B.

The A/D converter 72 performs analog-to-digital conversion processing as to the composition signal or program audio signal, and transfers the resulting composition data or program audio data to a sound processor 73. The sound processor 73 performs digital processing such as equalizing processing as to the composition data or program audio data provided from the A/D converter 72 and transfers this to a D/A converter 74. Thus, the D/A converter 74 performs digital-toanalog conversion processing as to the composition signal or program audio signal provided from the sound processor 73, and transfers the resulting composition signal or program audio signal to a speaker 76 via an amplifier 75. Thus, the control unit 70 can output the composition based on the composition signal or the program audio of a radio program based on the program audio signal from the speaker 76, and allow the user to listen thereto.

Incidentally, when the control unit 70 acquires the volume adjusting control signal via the cradle side terminal 4B, transferred from the wireless communication module 3, the control unit 70 controls the amplifier 75 based on the volume adjusting control signal to adjust the amplification of the composition signal or the program audio signal. Thus, the control unit 70 can adjust the volume of the composition or program audio according to the request of the user. Also when the control unit 70 acquires the a surround-sound quality control signal or an equalizing sound quality control signal transferred from the wireless communication module 3 via the cradle side terminal 4B, the control unit 70 controls the sound processor 73 based on the surround-sound quality control signal or equalizing sound quality control signal. Thus, the control unit 70 can adjust the sound quality of the composition or program audio for surround-sound or for equalizing as previously determined. While in this state, if the control unit 70 acquires a treble range adjusting control signal or bass range adjusting control signal transferred from the wireless communication module 3, via the cradle side terminal 4B, the control unit 70 controls the sound processor 73 based on this treble range adjusting control signal or bass range adjusting control signal. Thus the control unit 70 adjusts the treble range or bass range of a composition or program audio based on the sound quality previously determined for surround-sound or the sound quality previously determined for equalizing. Note that the control unit 70 can also notify various types of information such as volume level or current time and so forth to the user, by displaying this various information on a display 78 via a display controller 77.

Figure 18:
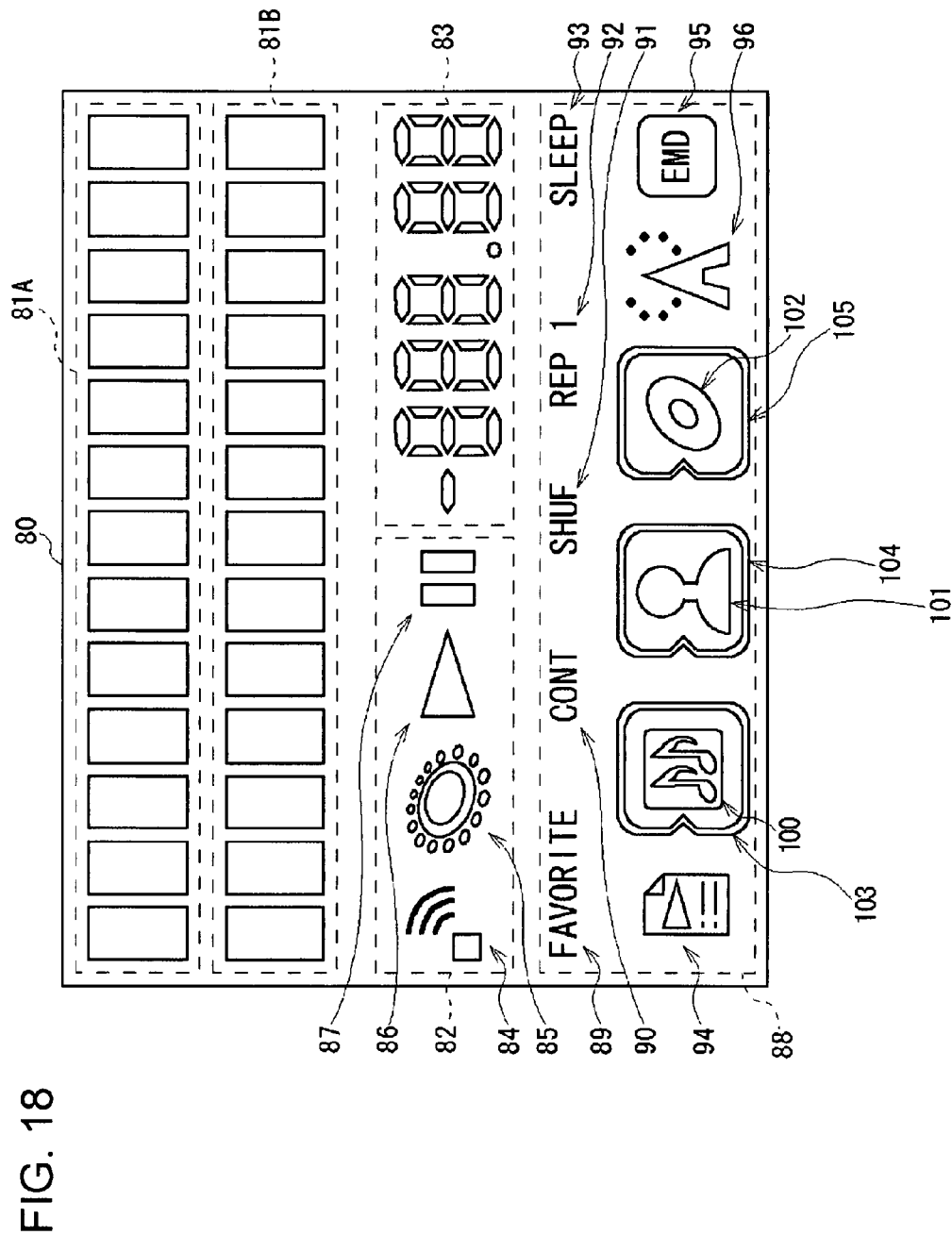
FIG. 18 is a schematic diagram illustrating the configuration of a display screen to be displayed on a wireless communication module display.

In addition to this configuration, in the event that the control unit 50 (FIG. 4) of the wireless communication module 3 executes the above-described various processing, the control unit 50 displays a display screen 80 on the display 3B such as that shown in FIG. 18. This display screen 80 has two rows of character display rows 81A and 81B on the upper side within the screen provided thereupon, and is configured to display characters such as the genre name, artist name, or album name selected by the user as the search keyword in these two rows of character display rows 81A and 81B. Also the display screen 80 has a center portion icon display region 82 and a playback time display portion 83 arranged linearly on the center portion within the screen. The center portion icon display region 82 is arranged to enable displaying of a communication status notification icon 84 for notifying the communication status between the wireless communication module 3 and the server 2, a server notification icon 85 for notifying the type of the server 2 with which to communicate (that is to say, whether or not the server 2 is the type manufactured to correspond to the wireless communication module 3), and playback notification icon 86 for notifying the playback of a composition, and pause notification icon 87 for notifying the temporary stopping of the playing of a composition.

Further, a lower side icon display region 88 is provided on the lower side within the screen of the display screen 80. The lower side icon display region 88 is arranged to enable display of a favorites notification icon 89 for notifying whether or not the composition during playback is a composition which is a favorite of the user, a normal playback notification icon 90 for notifying that normal playback mode has been selected for the playback mode of the composition, an order-change notification icon 91 for notifying that order-change playback mode has been selected for the playback mode of the composition, a repeat playback notification icon 92 for notifying that a one-song repeat playback mode or multiple repeat playback mode has been selected for the playback mode of the composition, and a sleep mode notification icon 93 for notifying that the device has transitioned to sleep mode. Also, the lower side icon display region 88 is arranged to enable display of a playlist playback notification icon 94 for notifying that a playlist is being used for playback of the composition, a distribution data acquiring notification icon 95 for notifying that the device has transitioned to distribution data acquiring mode, and a radio program acquiring notification icon 96 for notifying that the device has transitioned to radio program acquiring mode.

The control unit 50 of the wireless communication module 3 displays appropriate characters or icons according to the state of processing execution and so forth, from the state wherein no characters or icons are displayed within the display screen 80. That is to say, if the server 2 which is communicating wirelessly for example has been manufactured to correspond to the wireless communication module 3, the control unit 50 displays a server notification icon 85 within the display screen 80. Also in the case that the control unit 50 is communicating wirelessly with the server 2, the control unit 50 detects the communication status of the composition data and so forth, and based on the detection results thereof, displays at least one portion of the communication status notification icon 84. Further, when the control unit 50 executes playback processing of the composition data according to the user pressing the playback start key 17 on the remote controller 5, a playback notification icon 86 is displayed within the display screen 80 during the time of playback processing being executed. Also, when the control unit 50 temporarily stops playback processing according to the user pressing the pause key 18 on the remote controller 5 during playback processing of the composition data, a pause notification icon 87 is displayed within the display screen 80 during the time of the temporary stop.

Incidentally, normally the control unit 50 displays the playback time of a composition on the playback time display portion 83 within the display screen 80 during playback processing of the composition in a summing display mode. When the user presses the playback time display switchover key 24 on the remote controller 5 during playback processing of the composition data, the control unit 50 accordingly displays the playback time of the composition in a subtracting display mode as to the playback time display portion 83 within the display screen 80, and when the playback time display switchover key 24 is pressed again, the control unit 5 displays the playback time of the composition in a summing display mode as to the playback time display portion 83. The control unit 50 thus switches the display mode of the composition playback time as to the playback time display portion 83, based on the user pressing the playback time display switchover key 24.

Further, during the time of playback processing of composition data using a favorites list, or during playback processing of composition data if the user likes a composition and presses the composition registration key 14 on the remote control, the control unit 50 displays the favorites notification icon 89 within the display screen 80. In the event that the normal playback mode is selected according to the user pressing the playback mode selection key 26 on the remote controller 5, the control unit 50 displays the normal playback notification icon 90 within the display screen 80, and if the order-change playback mode is selected according to the user pressing the playback mode selection key 26, the control unit 50 displays the order-change notification icon 91 within the display screen 80. Further, in the event that the one-song repeat playback mode is selected according to the user pressing the repeat playback mode selection key 25 on the remote controller 5, the control unit 50 displays the entire playback notification icon 92 within the display screen 80 (for example, the characters "REP1" as in the diagram), and in the event that the multiple repeat playback mode is selected according to the user pressing the repeat playback mode selection key 25, the control unit 50 displays a portion of the repeat playback notification icon 92 within the display screen 80 (for example, only the characters "REP" as in the diagram). Further, when the sleep mode is set according to the user pressing the sleep mode selection key 11 on the remote controller 5, from that point in time until the power of the wireless communication module 3 is turned off, the control unit 50 displays the sleep mode notification icon 93 within the display screen 80.

Also, when the composition data is subjected to playback processing using a playlist obtained from the server 2, the control unit 50 displays the playlist playback notification icon 94 within the display screen 80, and if the mode is transitioned to the distribution data acquiring mode, and composition data provided by the distribution server is subjected to playback processing, the control unit 50 displays the distribution data acquiring notification icon 95 within the display screen 80. Further, if the mode is transitioned to the radio program acquiring mode, and program audio data of a radio program is being subjected to playback processing, the control unit 50 displays the radio program acquiring notification icon 96 within the display screen 80.

Additionally, the lower-side icon display region 88 of the display screen 80 (FIG. 18) is arranged to enable display of a keyword type selecting notification icon 100 for notifying that the keyword type "genre" has been selected by the user (hereafter called genre selecting notification icon), and corresponding to the genre selecting key 31 of the remote controller 5. Also, the lower-side icon display region 88 of the display screen 80 is arranged to enable display of a keyword type selecting notification icon 101 for notifying that the keyword type "artist" has been selected by the user (hereafter called artist selecting notification icon), and corresponding to the artist selecting key 32 of the remote controller 5. Further, the lower-side icon display region 88 of the display screen 80 is arranged to enable display of a keyword type selecting notification icon 102 for notifying that the keyword type "album disk" has been selected by the user (hereafter called album selecting notification icon), and corresponding to the album selecting key 33 of the remote controller 5.

Further, the lower-side icon display region 88 of the display screen 80 is arranged to enable display of a keyword selectable notification icon 103 in a frame shape for notifying that search keyword genre name is in the state of being selectable (hereafter called genre name selectable notification icon) so as to surround the genre selecting notification icon 100. Also, the lower-side icon display region 88 of the display screen 80 is arranged to enable display of a keyword selectable notification icon 104 in a frame shape for notifying that search keyword artist name is in the state of being selectable (hereafter called artist name selectable notification icon) so as to surround the artist selecting notification icon 101. Further, the lower-side icon display region 88 of the display screen 80 is arranged to enable display of a keyword selectable notification icon 105 in a frame shape for notifying that search keyword album name is in the state of being selectable (hereafter called album name selectable notification icon) so as to surround the album selecting notification icon 102.

When the user presses the genre selecting key 31 on the remote controller 5 (that is to say, when a genre selecting command is input according to this pressing operation), the control unit 50 determines that the keyword type selected by the user is "genre", and so displays the genre selecting notification icon 100 within the display screen 80. Also, when the user presses the artist selecting key 32 on the remote controller 5 (that is to say, when an artist selecting command is input according to this pressing operation), the control unit 50 determines that the keyword type selected by the user is "artist", and so displays the artist selecting notification icon 101 within the display screen 80. Further, when the user presses the album selecting key 33 on the remote controller 5 (that is to say, when an album selecting command is input according to this pressing operation), the control unit 50 determines that the keyword type selected by the user is "album disk", and so displays the album selecting notification icon 102 within the display screen 80.

The genre selecting notification icon 100 is formed as a picture design as with the picture design of a musical note showing "genre" as the keyword type which is drawn on the surface of the genre selecting key 31 described above, for example. Also, the artist selecting notification icon 101 is formed as a picture design as with the picture design of a person showing "artist" as the keyword type which is drawn on the surface of the artist selecting key 32 described above, for example. Further, the album selecting notification icon 102 is formed as a picture design as with the picture design of a disk showing "album disk" as the keyword type which is drawn on the surface of the album selecting key 33 described above, for example. Accordingly, when the user presses the genre selecting key 31, artist selecting key 32, and album selecting key 33 on the remote controller 5, the control unit 50 can easily and accurately allow the user to confirm the genre selecting key 31, artist selecting key 32, and album selecting key 33 pressed by the user, by the genre selecting notification icon 100, artist selecting notification icon 101, and album selecting notification icon 102, being displayed within the display screen according thereto, and also can easily and accurately allow the user to confirm the keyword type (that is to say, "genre", "artist", and "album disk") selected by the pressing operation.

Also, the genre selecting notification icon 100, artist selecting notification icon 101, and album selecting notification icon 102 are disposed within the display screen 80 in one row to correspond to the hierarchical level from the higher-level keyword type (that is to say, "genre") to the lower-level keyword type (that is to say, "album disk"). Then after the higher-level keyword type is selected, and the lower-level keyword type is then selected, the control unit 50 displays the genre selecting notification icon 100, artist selecting notification icon 101, and album selecting notification icon 102, corresponding to these keyword types, within the display screen 80. Thus, the control unit 50 can easily allow the user to confirm how the search criteria is narrowed down by making selections from the higher keyword type to the lower keyword type so as to follow the hierarchical level for example, by the display status of the genre selecting notification icon 100, artist selecting notification icon 101, and album selecting notification icon 102 within the display screen 80. Also with the remote controller 5 (FIG. 3), the genre selecting key 31, artist selecting key 32, and album selecting key 33 are disposed in one row on the one face 5A in the order from the higher keyword type ("genre") to the lower keyword type ("album disk") so as to follow the hierarchical order. Accordingly, with the positions of the genre selecting key 31, artist selecting key 32, and album selecting key 33 disposed on the one face 5A of the remote controller 5, the control unit 50 allows the user to easily press and operate the genre selecting key 31, artist selecting key 32, and album selecting key 33 according to the narrowing down of search criteria by the user, when the user selects the keyword type in the order from the higher level to the lower level so as to follow the hierarchical order to narrow down the search criteria.

The control unit 50 allows the user to arbitrarily select a genre name, artist name, or album name as the search keyword for each keyword type, but for each selection from the higher-level keyword type to the lower-level keyword type, the search keyword selected at the keyword type at one level higher than the selected keyword type is automatically set as search criteria, and only the one keyword type at the lowest level can be selected arbitrarily as the search keyword. Thus the control unit 50 can allow the user to easily and accurately narrow down the search criteria. In the event that the user selects at least one keyword type, the keyword type at the lowest level of the selections thereof is displayed with the genre name selectable notification icon 103, artist name selectable notification icon 104, or album name selectable notification icon 105 so as to surround only one of the genre selecting notification icon 100, artist selecting notification icon 101, or album selecting notification icon 102. Thus when the user selects a search keyword only with one keyword type, or selects sequential search keywords with multiple keyword types, the control unit 50 can allow the user to accurately confirm the only keyword type, wherein the search keyword is in a selectable state.

The control unit 50 uses the character display rows 81A and 81B within the display screen 80 for the selection of a search keyword. In actual practice, when the user selects a keyword type by pressing one of the genre selecting key 31, artist selecting key 32, or album selecting key 33, for example, the control unit 50 displays the first genre name, artist name, or album name, for example, within the type list corresponding to the selected keyword type in the upper character display row (hereafter specifically called the upper character display row) 81A of the two upper and lower rows of the character display rows 81A and 81B within the display screen 80. Then when the user presses the same genre selecting key 31, artist selecting key 32, or album selecting key 33, or presses the other direction keyword selecting key 34 and/or the one-direction keyword selecting key 35, the control unit 50 accordingly switches the genre name, artist name, or album name displayed on the upper character display row 81A within the display screen 80. Thus the control unit 50 can allow the user to select the genre name, artist name, and album name as the search keywords by the user actually visually confirming this within the display screen 80.

Also, when the user selects a lower-level keyword type by pressing the genre selecting key 31, artist selecting key 32, or album selecting key 33, following the selection of the higher-level keyword type and search keyword, the control unit 50 moves the search keyword such as genre name which has been displayed up to this point on the upper character display row 81A within the display screen 80, to the lower character display row (hereafter specifically called the lower character display row) 81B, and displays the first artist name or album name for example within the type list corresponding to the lower-level keyword type newly selected by the user in the upper character display row 81A. Then when the user presses the same artist selecting key 32 or album selecting key 33 again, or presses the other direction keyword selecting key 34 and/or the one-direction keyword selecting key 35, the control unit 50 accordingly switches the artist name or album name displayed on the upper character display row 81A within the display screen 80. Thus the control unit 50 can allow the user to select the artist name or album name as the lower level search keyword, after selection of the higher-level search keyword, by the user actually visually confirming this within the display screen 80.

Since the display screen 80 only has the two upper and lower rows of the upper character display row 81A and lower character display row 81B provided therewithin, after the user sequentially selects "genre" and "artist" as the keyword type by pressing the genre selecting key 31 and artist selecting key 32, then also selects "album disk" as a keyword type by further pressing the album selecting key 33, the control unit 50 deletes the genre name serving as the search keyword which has been displayed on the lower character display row 81B within the display screen 80 up to that point in time, and moves the artist name serving as the search keyword which has been displayed on the upper character display row 81A to the lower character display row 81B so as to be displayed therein, and also displays the first album name for example within the album list DL corresponding to the "album disk" selected by the user in the upper character display row 81A. When the user then presses the album selecting key 33 or the other direction keyword selecting key 34 and/or the one-direction keyword selecting key 35, the control unit 50 accordingly switches the album name to be displayed in the upper character display row 81A within the display screen 80. Thus, with the search keywords selected with "genre" and "artist" as the higher-level keyword types serving as the search criteria, the control unit 50 can allow the user to select the album name as the lower level search keyword by the user actually visually confirming this within the display screen 80.

Incidentally, when all three types of keyword types are selected by the user and a display switchover command is input according to a pressing operation as to the display switchover key 16 on the remote controller 5, the control unit 50 temporarily deletes the album name serving as the search keyword which has been displayed on the upper character display row 81A within the display screen 80 up to that point in time, returns the artist name serving as the search keyword which has been displayed on the lower character display row 81B to the upper character display row 81A so as to be displayed therein, and also displays the genre name serving as the search keyword selected by the higher-level "genre" again in the lower character display row 81B. Thus even if only the two upper and lower rows which are the upper character display row 81A and lower character display row 81B for displaying the search keywords are provided, which is less than the number of keyword types, in the event that all three types of keyword types are selected, the control unit 50 can allow the user to appropriately confirm the search keyword selected for each keyword by switching the display content as to the upper character display row 81A and the lower character display row 81B.

After the user selects the lower-level keyword type, if a keyword type higher than this is selected, the control unit 50 deletes the search keyword selected by the lower-level keyword type at that point in time and the selection of this lower-level keyword type itself. In this case, the control unit 50 displays the lower level search keyword of the search keywords not having deleted the selection thereof in the upper character display row 81A within the display screen 80, and similarly displays the higher-level search keyword of the search keywords not having deleted the selection thereof in the lower character display row 81B. Thus, of the upper character display row 81A and lower character display row 81B within the display screen 80, the control unit 50 displays the search keyword distinguished by the currently selected lowest-level keyword type is displayed in the upper character display row 81A, and the search keyword distinguished by the highest-level keyword type applicable based on the selection situation of the keyword types in the upper character display row 81A.

Note that the control unit 50 executes the deleting of the selection of the lower-level keyword type, regardless of whether or not the selection of the search keyword in the lower-level keyword type has been confirmed. Accordingly, the control unit 50 can allow the user to easily change the search keyword selection, and also can prevent with certainty that the unrelated lower level search keyword remains selected and search criteria unexpected to the user is set. After the lower-level keyword type is selected, if the higher-order keyword type is then selected, the control unit 50 turns off the artist selecting notification icon 101 or album selecting notification icon 102 corresponding to the lower-level keyword types within the display screen 80, and displays the genre selecting notification icon 100 or artist selecting notification icon 101 corresponding to the higher-level keyword types. Thus by turning off the artist selecting notification icon 101 or album selecting notification icon 102 corresponding to the lower-level keyword types, the control unit 50 can notify the user at that point in time that the search keyword selected with the lower-level keyword type and the selection of the lower-level keyword type itself has been deleted.

In other words, as shown in FIG. 19, if the user presses the genre selecting key 31 to select "genre" in a state wherein no keyword type has been selected (hereafter, this will be referred to a first status), the control unit 50 displays the genre selecting notification icon 100 within the display screen 80. Thus, the control unit 50 notifies the user by the display of the genre selecting notification icon 100 that "genre" as a keyword type has been selected. At this time, the control unit 50 displays the genre name selectable notification icon 103 surrounding the genre selecting notification icon 100 on the display screen 80. Thus the control unit 50 also notifies the user that genre name as a search keyword distinguished by the keyword type "genre" has become selectable.

Also, if the user selects "artist" by pressing the artist selecting key 32 while in the first status, the control unit 50 displays the artist selecting notification icon 101 on the display screen 80. Thus, by displaying the artist selecting notification icon 101, the control unit 50 notifies the user that "artist" as a keyword type has been selected. At this time, the control unit 50 displays the artist name selectable notification icon 104 surrounding the artist selecting notification icon 101 on the display screen 80. Thus the control unit 50 also notifies the user that artist name as a search keyword distinguished by the keyword type "artist" has become selectable.

Also, if the user selects "album disk" by pressing the album selecting key 33 while in the first status, the control unit 50 displays the album selecting notification icon 102 on the display screen 80. Thus, by displaying the album selecting notification icon 102, the control unit 50 notifies the user that "album disk" as a keyword type has been selected. At this time, the control unit 50 displays the album name selectable notification icon 105 surrounding the album selecting notification icon 102 on the display screen 80. Thus the control unit 50 also notifies the user that album name as a search keyword distinguished by the keyword type "album disk" has become selectable.

If the user presses the album selecting key 33 to select "album disk", and the album selecting notification icon 102 as well as the album name selectable notification icon 105 surrounding the album selecting notification icon 102 are displayed accordingly on the display screen 80, in this state (hereafter, this will be referred to as a second status), if the user presses the genre selecting key 31 to select "genre" which is a higher level than "album disk", the control unit 50 turns off the album selecting notification icon 102 on the display screen 80, and also displays the genre selecting notification icon 100. Thus, the control unit 50 notifies the user that "genre" as a keyword type has been newly selected, and that accordingly the selections of the keyword type "album disk" which is of a lower level than the "genre" as well as the album name serving as the search keyword have been deleted. At this time, the control unit 50 turns off the album name selectable notification icon 105 surrounding the album selecting notification icon 102 on the display screen 80, and displays the genre name selectable notification icon 103 surrounding the genre selecting notification icon 100. Thus the control unit 50 also notifies the user that album name as a search keyword has become unselectable, and that genre name as a search keyword distinguished by the keyword type "genre" has once again become selectable.

Also, in the second status, when the user presses the artist selecting key 32 to select "artist" which is of a higher level than "album disk", the control unit 50 turns off the album selecting notification icon 102 on the display screen 80, and displays the artist selecting notification icon 101. Thus the control unit 50 notifies the user that "artist" as a keyword type has been newly selected, and that accordingly the selection "album disk" as a keyword type of a lower level than "artist" has been deleted. At this time, the control unit 50 turns off the album name selectable notification icon 105 surrounding the album selecting notification icon 102, and displays the artist name selectable notification icon 104 surrounding the artist selecting notification icon 101. Thus the control unit 50 also notifies the user that album name as a search keyword has become unselectable, and that artist name as a search keyword distinguished by the keyword type "artist" has become selectable.

Note that if the user presses the album selecting key 33 while in the second status, the control unit 50 switches the album name selected from the album list DL while the display remains for the album selecting notification icon 102 and the album name selectable notification icon 105 surrounding the album selecting notification icon 102 within the display screen 80. Thus the control unit 50 can allow the user to arbitrarily select an album name as a search keyword from the album list DL.

If the user presses the artist selecting key 32 to select "artist", and the artist selecting notification icon 101 as well as the artist name selectable notification icon 104 surrounding the artist selecting notification icon 101 within the display screen 80 is displayed accordingly, in this state (hereafter, this will be referred to as a third status), if the user presses the genre selecting key 31 to select "genre" which is a higher level than "artist", the control unit 50 turns off the artist selecting notification icon 101 on the display screen 80, and also displays the genre selecting notification icon 100. Thus, the control unit 50 notifies the user that "genre" as a keyword type has been newly selected, and that accordingly the selections of the keyword type "artist" which is of a lower level than the "genre" as well as the artist name serving as the search keyword have been deleted. At this time, the control unit 50 turns off the artist name selectable notification icon 104 surrounding the artist selecting notification icon 101 on the display screen 80, and displays the genre name selectable notification icon 103 surrounding the genre selecting notification icon 100. Thus the control unit 50 also notifies the user that artist name as a search keyword has become unselectable, and that genre name as a search keyword distinguished by the keyword type "genre" has once again become selectable.

Note that if the user presses the artist selecting key 32 while in the third status, the control unit 50 switches the artist name selected from the artist list RL while the display remains for the artist selecting notification icon 101 and the artist name selectable notification icon 104 surrounding the artist selecting notification icon 101 within the display screen 80. Thus the control unit 50 can allow the user to arbitrarily select an artist name as a search keyword from the artist list RL.

Also, if the user presses the album selecting key 33 to select "album disk" which is of a lower level than "artist" in the third status, the control unit 50 keeps the artist selecting notification icon 101 displayed on the display screen 80, and also displays the album selecting notification icon 102. Thus the control unit 50 notifies the user that selections of "artist" as the keyword type, and the artist name as the search keyword remain valid, but also the "album disk" keyword type which is of a lower level has been newly selected. At this time, the control unit 50 turns off the artist name selectable notification icon 104 surrounding the artist selecting notification icon 101 on the display screen 80, and displays the album name selectable notification icon 105 surrounding the album selecting notification icon 102. In other words, by changing the display of the artist name selectable notification icon 104 surrounding the artist selecting notification icon 101 to the album name selectable notification icon 105 surrounding the album selecting notification icon 102, the control unit 50 notifies the user that the album name serving as the search keyword which is selected in the third status becomes the search criteria, and further that the album name serving as a search keyword distinguished by the keyword type "album" has additionally become selectable.

After the user presses the artist selecting key 32 to select "artist", then presses the album selecting key 33 to select "album disk", and the artist selecting notification icon 101 is correspondingly displayed on the display screen 80, in a state where the album selecting notification icon 102 and the surrounding album name selectable notification icon 105 are displayed (hereafter referred to as a fourth status), when the user presses the genre selecting key 31 to select "genre" which is of a higher level than both "artist" and "album disk", the control unit 50 turns off both of the artist selecting notification icon 101 and the album selecting notification icon 102 within the display screen 80, and displays the genre selecting notification icon 100. Thus the control unit 50 notifies the user that a new keyword type "genre" is selected, and that the keyword types "artist" and "album disk" which are of a lower level than the "genre", as well as the artist name and album name selections serving as the search keywords, have been deleted. At this time the control unit 50 turns off the album name selectable notification icon 105 surrounding the album selecting notification icon 102 on the display screen 80, and displays the genre name selectable notification icon 103 surrounding the genre selecting notification icon 100. Thus, the control unit 50 notifies the user that the album name as a search keyword has become unselectable, and the genre name serving as the search keyword distinguished by the keyword type "genre" has once again become selectable.

Also, when the user presses the artist selecting key 32 to select "artist" again which is of a higher level than "album disk" in the fourth state, the control unit 50 turns off the album selecting notification icon 102 on the display screen 80, and continues the display of the artist selecting notification icon 101. Thus, the control unit 50 notifies the user that the selections of "album disk" as a keyword type of a lower level than "artist" and the album name serving as a search keyword are deleted, and that only "artist" as the keyword type is being selected. At this time the control unit 50 turns off the album name selectable notification icon 105 surrounding the album selecting notification icon 102 on the display screen 80, and displays the artist name selectable notification icon 104 surrounding the artist selecting notification icon 101. Thus, the control unit 50 notifies the user that the album name as a search keyword has become unselectable, and the artist name serving as the search keyword distinguished by the keyword type "artist" has once again become selectable.

Note that when the user presses the album selecting key 33 while in the fourth status, the control unit 50 switches the album name selected from the album list DL while the display remains for the album selecting notification icon 102 and the album name selectable notification icon 105 surrounding the album selecting notification icon 102, along with the display of the artist selecting notification icon 101. Thus the control unit 50 can allow the user to arbitrarily select an album name as a search keyword from the album list DL.

While in a state wherein the control unit 50 displays the genre selecting notification icon 100 and the genre name selectable notification icon 103 surrounding the genre selecting notification icon 100 on the display screen 80 according to the user pressing the genre selecting key 31 to select "genre" (hereafter this will be referred to as a fifth status), and the user presses the genre selecting key 31, the control unit 50 switches the genre name selected within the genre list JL while continuously displaying the genre selecting notification icon 100 and the genre name selectable notification icon 103 surrounding the genre selecting notification icon 100. Thus, the control unit 50 can allow the user to select the genre name serving as the search keyword within the genre list JL.

While in the fifth status, if the user presses the artist selecting key 32 to select "artist" which is of a lower level than "genre", the control unit 50 displays the artist selecting notification icon 101 while the genre selecting notification icon 100 remains displayed on the display screen 80. Thus, the control unit 50 notifies the user that the selections of "genre" as a keyword type and the genre name as the search keyword remain valid, but that also the keyword type "artist" which is of a lower level thereof has been newly selected. At this time, the control unit 50 turns off the genre name selectable notification icon 103 which surrounds the genre selecting notification icon 100 on the display screen 80, and also displays the artist name selectable notification icon 104 which surrounds the artist selecting notification icon 101. In other words, by changing the display of the genre name selectable notification icon 103 surrounding the genre selecting notification icon 100 to the display of the artist name selectable notification icon 104 surrounding the artist selecting notification icon 101, the control unit 50 can notify the user that the genre name serving as the search keyword selected in the fifth status becomes the search criteria, and further that the artist name serving as the search keyword distinguished by the keyword type "artist" has also become selectable.

While in the fifth status, if the user presses the album selecting key 33 to select "album disk" which is of a lower level than "genre", the control unit 50 displays the album selecting notification icon 102 while the genre selecting notification icon 100 remains displayed on the display screen 80. Thus, the control unit 50 notifies the user that the selections of "genre" as a keyword type and the genre name as the search keyword remain valid, but that also the keyword type "album disk" which is of a lower level thereof has been newly selected. At this time, the control unit 50 turns off the genre name selectable notification icon 103 which surrounds the genre selecting notification icon 100 on the display screen 80, and also displays the album name selectable notification icon 105 which surrounds the album selecting notification icon 102. In other words, by changing the display of the genre name selectable notification icon 103 surrounding the genre selecting notification icon 100 to the display of the album name selectable notification icon 105 surrounding the album selecting notification icon 102, the control unit 50 can notify the user that the genre name serving as the search keyword selected in the fifth status becomes the search criteria, and further that the album name serving as the search keyword distinguished by the keyword type "album disk" has also become selectable.

While in a state wherein the control unit 50 displays the album selecting notification icon 102 and the surrounding album name selectable notification icon 105 (hereafter referred to as a sixth status), after the user has pressed the genre selecting key 31 to select "genre", and after the genre selecting notification icon 100 is displayed according to the album selecting key 33 being pressed to select "album disk", when the user presses the genre selecting key 31, the control unit 50 turns off the album selecting notification icon 102 while continuously displaying the genre selecting notification icon 100 on the display screen 80. Thus, the control unit 50 deletes the selection of "album disk" as the keyword type, and the album name serving as the search keyword, and notifies the user that only the selection of "genre" as the keyword type of a higher level than the "album disk" will be valid. At this time, the control unit 50 turns off the album name selectable notification icon 105 surrounding the album selecting notification icon 102 on the display screen 80, and displays the genre selectable notification icon 103 surrounding the genre selecting notification icon 100. Thus the control unit 50 notifies the user that the album name serving as the search keyword has become unselectable, and that the genre name distinguished by the keyword type "genre" has once again become selectable.

While in the sixth status, if the user presses the artist selecting key 32 to select "artist" which is of a lower level than "genre" and also is of a higher level than "album disk", the control unit 50 turns off the album selecting notification icon 102 within the display screen 80, and displays the artist selecting notification icon 101 while the genre selecting notification icon 100 remains displayed on the display screen 80. Thus, the control unit 50 notifies the user that "artist" as a keyword type has been newly selected, and also notifies that the selections of "album disk" as a keyword type of a lower level than that of the "artist" and the album name serving as the search keyword have been deleted, while the selections of "genre" as a keyword type of a higher level than the "artist" and the genre name serving as a search keyword remain valid. At this time, the control unit 50 turns off the album name selectable notification icon 105 surrounding the album selecting notification icon 102 on the display screen 80, and also displays the artist name selectable notification icon 104 surrounding the artist selecting notification icon 101. Thus the control unit 50 notifies the user that while the album name serving as a search keyword becomes unselectable, the artist name serving as a search keyword distinguished by the keyword type "artist" has become selectable, with the genre name serving as the search keyword selected in the sixth status as the search criteria.

Note that when the user presses the album selecting key 33 while in the sixth status, the control unit 50 continuously displays the genre selecting notification icon 101 on the display screen 80, and while also continuously displays the album selecting notification icon 102 and the album name selectable notification icon 105 surrounding the album selecting notification icon 102, switches the album name selected within the album list DL. Thus, the control unit 50 can allow the user to arbitrarily select an album name as a search keyword from the album list DL.

While in a state wherein the control unit 50 displays the artist selecting notification icon 101 and the artist name selectable notification icon 104 surrounding the artist selecting notification icon 101 on the display screen 80, after the genre selecting notification icon 100 is displayed according to the artist selecting key 32 being pressed to select "artist" after the user presses the genre selecting key 31 to select "genre" (hereafter referred to as a seventh status), when the user presses the genre selecting key 31, the control unit 50 turns off the artist selecting notification icon 101 while continuously displaying the genre selecting notification icon 100 on the display screen 80. Thus, the control unit 50 notifies the user that the selections of "artist" as a keyword type of a lower level than the "genre" and the artist name serving as a search keyword are deleted, while the selection of "genre" as a keyword type remains valid. At this time the control unit 50 turns off the artist name selectable notification icon 104 surrounding the artist selecting notification icon 101 on the display screen 80, and displays the genre name selectable notification icon 103 surrounding the genre selecting notification icon 100. Thus the control unit 50 notifies the user that the artist name serving as a search keyword has become unselectable, and that the genre name serving as a search keyword distinguished by the keyword type "genre" has once again become selectable.

Also, while in the seventh state, if the user presses the artist selection key 32, the control unit 50 switches the artist name selected in the artist list RL while continuously displaying the genre selection notification icon 100 on the display screen 80, and also continuously displaying the artist selecting notification icon 101 and the surrounding artist name selectable notification icon 104. Thus, the control unit 50 can allow the user to arbitrarily select an artist name as the search keyword within the artist list RL.

Further, while in the seventh status, if the user presses the album selecting key 33 to select "album disk", the control unit 50 displays the album selecting notification icon 102 while continuously displaying both of the genre selecting notification icon 100 and the artist selecting notification icon 101 within the display screen 80. Thus the control unit 50 notifies the user that "album disk" as a keyword type of a lower level than "genre" and "artist" has been newly selected, while the selections of the genre name and artist name serving as keyword types, and the genre name and artist name serving as search keywords remain valid. At this time, the control unit 50 turns off the artist name selectable notification icon 104 surrounding the artist selecting notification icon 101 on the display screen 80, and displays the album name selectable notification icon 105 surrounding the album selecting notification icon 102. In other words, by changing the display of the artist name selectable notification icon 104 surrounding the artist selecting notification icon 101 to the display of the album name selectable notification icon 105 surrounding the album selecting notification icon 102, the control unit 50 notifies the user that the artist name serving as the search keyword selected in the seventh status becomes the search criteria, and further that the album name serving as the search keyword distinguished by the keyword type "album" has also become selectable.

While in a state wherein the control unit 50 displays the genre selecting notification icon 100 and the artist selecting notification icon 101 and the album selecting notification icon 102 and the surrounding album notification icon 105 on the display screen 80 corresponding to the user sequentially pressing the genre selecting key 31, artist selecting key 32, and album selecting key 33 to sequentially select "genre", "artist", and "album" (hereafter referred to as an eighth status), when the user presses the genre selecting key 31 to again select "genre" which is of a higher level than both "artist" and "album disk", the control unit 50 turns off both of the artist selecting notification icon 101 and the album selecting notification icon 102, while continuously displaying the genre selecting notification icon 100 on the display screen 80. Thus, the control unit 50 notifies the user that the selections of "artist" and "album disk" as keyword types of a lower level than the "genre" and the artist name and album name serving as search keywords are deleted, while only the selection of "genre" as a keyword type remains valid. At this time the control unit 50 turns off the album name selectable notification icon 105 surrounding the album selecting notification icon 102 on the display screen 80, and displays the genre name selectable notification icon 103 surrounding the genre selecting notification icon 100. Thus the control unit 50 notifies the user that the album name serving as a search keyword has become unselectable, and that only the genre name serving as a search keyword distinguished by the keyword type "genre" has once again become selectable.

Further, while in the eighth status, if the user presses the artist selecting key 32 to select "artist", the control unit 50 turns off the album selecting notification icon 102 while displaying both of the genre selecting notification icon 100 and the artist selecting notification icon 101 within the display screen 80. Thus the control unit 50 notifies the user that "album disk" as a keyword type of a lower level than "artist" has been deleted, while the selections of "genre" and "artist" serving as keyword types remain valid. At this time, the control unit 50 turns off the album name selectable notification icon 105 surrounding the album selecting notification icon 102 on the display screen 80, and displays the artist name selectable notification icon 104 surrounding the artist selecting notification icon 101. Thus, the control unit 50 notifies the user that the album name serving as a search keyword has become unselectable, and that the artist name serving as the search keyword distinguished by the keyword "artist" has once again become selectable.

While in the eighth status, if the user presses the album selecting key 33, the control unit 50 continuously displays the genre selecting notification icon 100 and the artist selecting notification icon 101 on the display screen 80, and also while continuously displaying the album selecting notification icon 102 and the surrounding album name selectable notification icon 105, the control unit 50 switches the album name selected in the album list DL. Thus, the control unit 50 can allow the user to arbitrarily select the album name serving as a search keyword in the album list DL.

Figure 20:
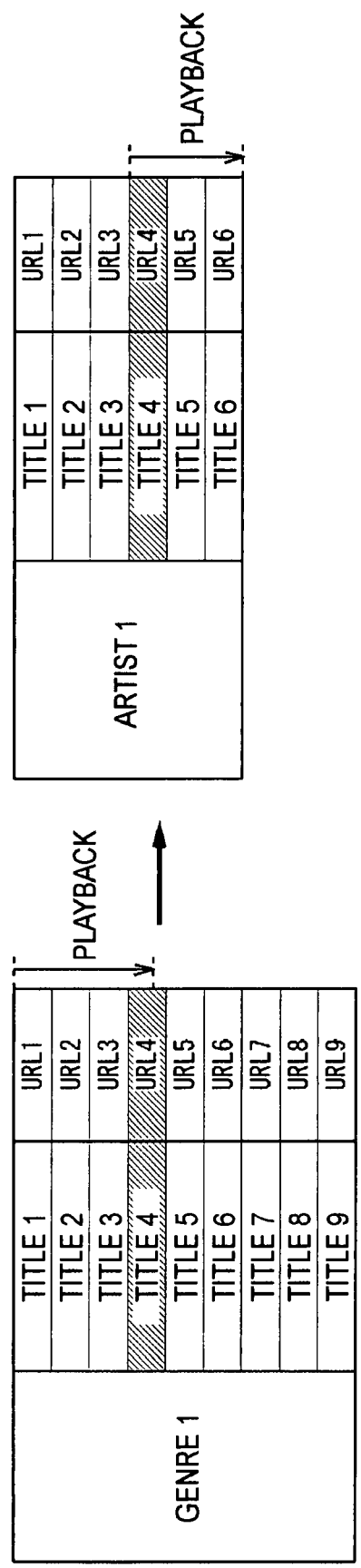
FIG. 20 is a schematic diagram describing switchover of playback processing of composition data by change to the search criteria.

In a situation according to the present embodiment, when the user selects a higher-level keyword type and a search keyword to be distinguished therewith, and then selects a lower-level keyword type, the control unit 50 of the wireless communication module 3 automatically sets the search keyword selected with the higher-level keyword type as the search criteria. Also, after the user selects the search keyword along with the keyword type, and confirms the selection by pressing the enter key 28 on the remote controller 5, the control unit 50 sets the selected search keyword as the search criteria. Thus only when the search criteria is confirmed will the control unit 50 generate the above-described composition acquiring list. Then as shown in FIG. 20, while the control unit 50 is subjecting the composition data to playback processing using the composition acquiring list generated according to the search criteria, if a new search keyword is selected or a new composition acquiring list is generated by selecting "all compositions", the control unit 50 compares the content of the composition acquiring list used for playback processing up to that point in time to the content of the composition acquiring list generated at that point in time. As a result, if the composition title of the composition data which is being subjected to playback processing using the previous composition acquiring list is also included in the newly generated composition acquiring list, the control unit 50 interrupts the playback processing of the composition data using the previous composition acquiring list, and using the new composition acquiring list, resumes playback processing from the beginning of the composition data of which the playback processing has been interrupted.

The search criteria called "all compositions" which is selectable by the user can be searched as all composition data stored in the server 2 to be played back, and the search criteria including the search keyword selected based on the keyword type can be searched as a portion of all of the composition data stored in the server 2 to be played back. Therefore, it can be said that the search criteria called "all compositions" has all search keywords which are selectable by keyword type included therein. Also, regarding for example two types of search criteria including search keywords selected based on the keyword types, even in a case wherein the number of search keywords included therein differ, if at least one search keyword which is the same is included, both can search for the same composition data to be selected. That is to say, in the event that the composition title of the composition data which had been subjected to playback processing using the previous composition acquiring list is included in the newly generated composition acquiring list, if the control unit 50 interrupts the playback processing of the composition data using the previous composition acquiring list, and begins playback processing from the composition data at the beginning of the list using the new composition acquiring list, there is the possibility of causing the user to listen to the same multiple compositions multiple times before and after the change of the composition acquiring list.

Therefore, if the composition title of the composition data during playback processing using the previous composition acquiring list is included also in the newly generated composition acquiring list, when beginning playback processing of the composition data using the new composition acquiring list, the control unit 50 first subjects the composition data subjected to playback processing partway according to the previous composition acquiring list to playback processing. Thus, the control unit 50 prevents causing the user to listen again to playback processing of composition data using the new composition acquiring list of a composition which the user has already listened to with the playback processing of the composition data using the previous composition acquiring list. That is to say, the control unit 50 avoids the user listening to the same composition multiple times before and after the change of the composition acquiring list, and attempts to allow listening of different compositions. Also, when the control unit 50 interrupts playback processing of the composition data using the previous composition acquiring list, if one composition data is subjected to playback processing partway through and then the playback processing is interrupted, the composition data wherein the playback processing thereof is interrupted is subjected again to playback processing from the beginning according to the new composition acquiring list, and so the composition wherein playback processing has been interrupted partway through can be provided to the user for listening again.

Incidentally, when the control unit 50 generates a new composition acquiring list in the state wherein the playback processing of the composition data using the previous composition acquiring list is stopped, the playback processing is started from the first composition data in the list using the new composition acquiring list, or from a predetermined composition data selected in advance or arbitrarily such as the composition data of the same composition title as the composition title included in the previous composition acquiring list. Also, when the composition title of the composition data which had been subjected to playback processing using the previous composition acquiring list is not included in the newly generated composition acquiring list, the control unit 50 interrupts the playback processing of the composition data using the previous composition acquiring list, and starts playback processing with composition data from the first of the list, for example, using the new composition acquiring list.

Figure 21:
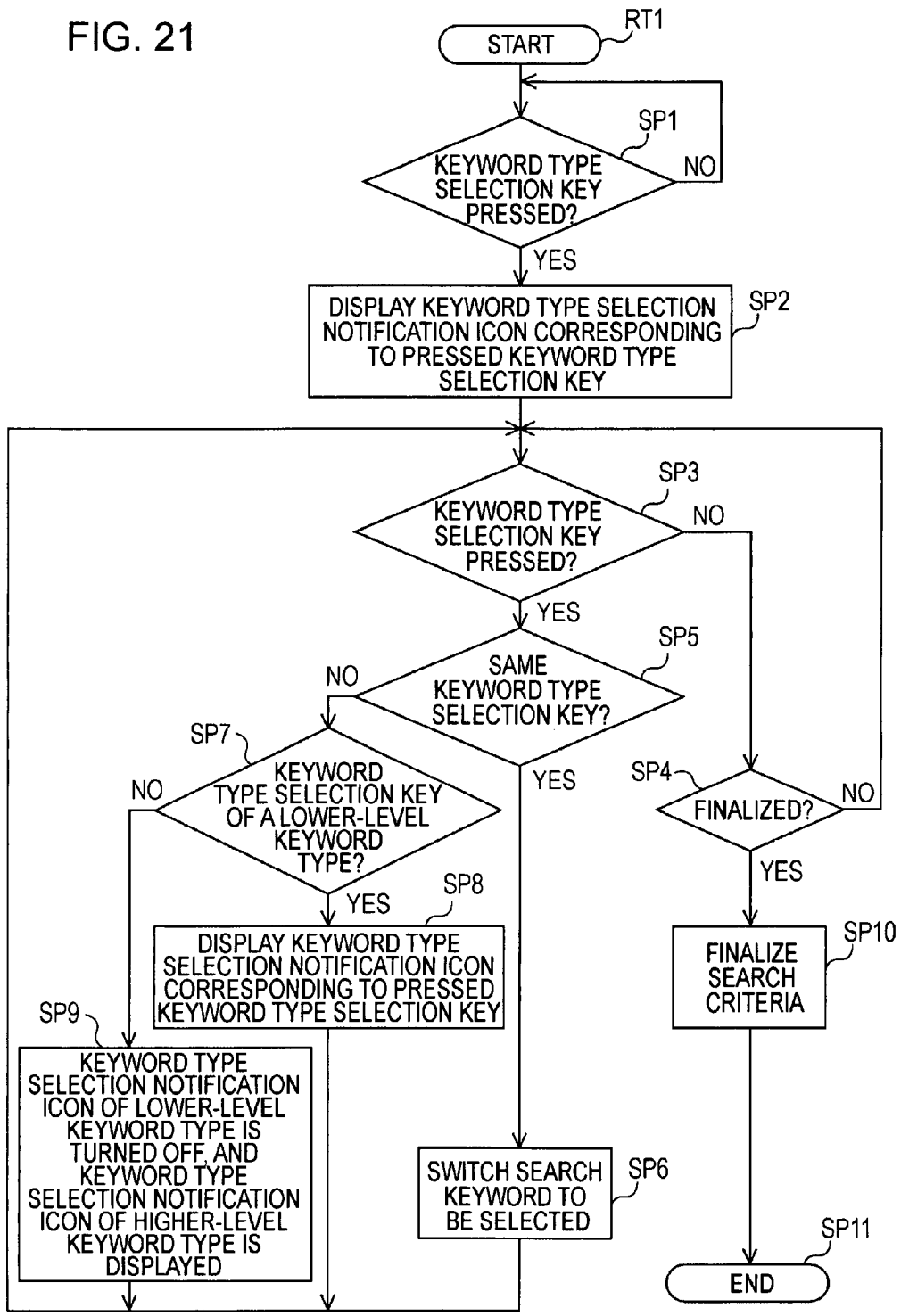
FIG. 21 is a flowchart showing search keyword input processing procedures.

Here, in actual practice, the control unit 50 of the wireless communication module 3 executes setting of search criteria according to the input of the above-described search keywords, according to the search keyword input program stored beforehand in the internal memory. That is to say, when the wireless communication module 3 is started, the control unit 50 begins a search keyword input processing procedure RT1, shown in FIG. 21, according to a search keyword input program. When the search keyword input processing procedure RT1 is started, the control unit 50 awaits the user pressing the genre selecting key 31, artist selecting key 32, and album selecting key 33 in step SP1. When one of the genre selecting key 31, artist selecting key 32, and album selecting key 33 is pressed by the user, and the keyword type "genre", "artist", or "album disk" is selected, the control unit 50 advances the process to the next step SP2.

In step SP2, the control unit 50 displays the genre selecting notification icon 100, artist selecting notification icon 101, or album selecting notification icon 102 on the display screen 80 displayed in the display 3B, corresponding to the genre selecting key 31, artist selecting key 32, or album selecting key 33 pressed by the user (that is to say, the keyword types "genre", "artist" or "album disk" selected by the user), and also displays the genre name selectable notification icon 103, artist name selectable notification icon 104, or album name selectable notification icon 105 so as to surround the displayed genre selecting notification icon 100, artist selecting notification icon 101, or album selecting notification icon 102, and advances the process to the next step SP3.

In step SP3, the control unit 50 determines whether or not one of the genre selecting key 31, artist selecting key 32, and album selecting key 33 has been pressed again by the user. In the event that the result of step SP3 is NO, this indicates that for example a new keyword type or search keyword has not yet been selected by the user. Accordingly, in the event of NO, the control unit 50 advances the process to step SP4. In step SP4, the control unit 50 determines whether or not the selection of the genre name, artist name, or album name serving as a search keyword by keyword type selected beforehand has been finalized. In the event that the result of step SP4 is NO, this indicates that there is the possibility of a keyword type or search keyword yet to be selected by the user. Accordingly, in the event of NO, the control unit 50 returns the flow to step SP3. Thereafter, the control unit 50 repeats the processing in step SP3 and step SP4 cyclically until YES is obtained in step SP3 or step SP4. Thus the control unit 50 awaits one of the genre selecting key 31, artist selecting key 32, and album selecting key 33 to be pressed by the user again, and finalizing of the selection of a genre name, artist name, or album name as a search keyword distinguished by the keyword type selected beforehand.

Now, in the event that the result of step SP3 is YES, this indicates that the user has pressed one of the genre selecting key 31, artist selecting key 32, and album selecting key 33 again. Accordingly, when YES is obtained, the control unit 50 advances the flow to step SP5. In step SP5, the control unit 50 determines whether or not the genre selecting key 31, artist selecting key 32, or album selecting key 33 pressed again by the user is the same operating key as the genre selecting key 31, artist selecting key 32, or album selecting key 33 pressed previously. In the event that the result of step SP5 is YES, this indicates that in order to select a genre name, artist name, or album name serving as a search keyword by keyword type which is selected by the user beforehand, the genre selecting key 31, artist selecting key 32, or album selecting key 33 pressed previously is the same genre selecting key 31, artist selecting key 32, or album selecting key 33 which is pressed again. Accordingly, when YES, the control unit 50 advances the flow to step SP6. Then in step SP6 the control unit 50 switches the genre name, artist name, or album name to be selected from multiple genre names, artist names, or album names serving as search keywords distinguished by keyword type, and the flow returns to step SP3.

Now, in the event that the result of step SP5 is NO, this indicates that in order to select a keyword type differing from the keyword type previously selected by the user, a genre selecting key 31, artist selecting key 32, or album selecting key 33 has been pressed, which differs from the genre selecting key 31, artist selecting key 32, or album selecting key 33 previously pressed. Accordingly, when NO, the flow advances to the next step SP7. Then in step SP7, the control unit 50 determines whether or not the genre selecting key 31, artist selecting key 32, or album selecting key 33 pressed again by the user is for selecting a keyword type of a lower level than the keyword type selectable by the genre selecting key 31, artist selecting key 32, or album selecting key 33 previously pressed. In the event that the result of step SP7 is YES, this indicates that in order for the user to narrow down the search criteria, the keyword types have been sequentially selected in order from the higher level to the lower level so as to follow the hierarchy. Accordingly, when YES, the flow advances to the next step SP8. Then in step SP8, the control unit 50 continuously displays the previous genre selecting notification icon 100 or the artist selecting notification icon 101 on the display screen 80 which is displayed on the display 3B, while additionally displaying the artist selecting notification icon 101 or album selecting notification icon 102 corresponding to the artist selecting key 32 or album selecting key 33 newly pressed by the user (that is to say, "artist" or "album disk" serving as a keyword type additionally selected by the user). Also at this time, the control unit 50 turns off the genre name selectable notification icon 103 or the artist name selectable notification icon 104 which are displayed so as to surround the previous genre selecting notification icon 100 or artist selecting notification icon 101 within the display screen 80, displays the artist name selectable notification icon 104 or album name selectable notification icon 105 which surround the additionally displayed artist selecting key 32 or album selecting key 33, and the flow returns to step SP3.

Now, in the event that the result of step SP7 is NO, this indicates that a keyword type of a higher level than the previously selected keyword type has been selected in order for the user to re-select the search keyword by a higher-level keyword type and thus change the search criteria. Accordingly, when NO, the control unit 50 advances to step SP9.

Then in step SP9, the control unit 50 turns off the artist selecting notification icon 101 and/or album selecting notification icon 102 corresponding to a keyword type of a lower level than the keyword type of a higher level selected again by the user, from the previous artist selecting notification icon 101 and/or album notification icon 102 on the display screen 80 which is displayed on the display 3B, and newly or continuously displays the genre selecting notification icon 100 or artist selecting notification icon 101 corresponding to the higher-level keyword type. Also the control unit 50 turns off the artist name selectable notification icon 104 or album name selectable notification icon 105 which has been displayed so as to surround the artist selecting notification icon 101 or album selecting notification icon 102 which is turned off in the display screen 80, the control unit 50 displays the genre name selectable notification icon 103 or artist name selectable notification icon 104 surrounding the genre selecting notification icon 100 or artist selecting notification icon 101 corresponding to the keyword type of the lowest level out of the genre selecting notification icon 100 and/or artist selecting notification icon 101 displayed at this point in time, and the flow returns to step SP3. Thus during the time until the user finalizes the selection of the search keyword, the control unit 50 cyclically repeatedly executes the processing in step SP3 through step SP9. Thus, the control unit 50 can allow the user to arbitrarily selects one or multiple keyword types along with search keywords.

Now, in the event that the result of step SP4 is YES, this indicates that the user has finalized the selection of the search keyword. Accordingly, the control unit 50 advances the process to the next step SP10 when YES is obtained. In step SP10, the control unit 50 sets the search keyword selected and finalized by the user to be the search criteria, and after generating a composition acquiring list according to this search criteria, the flow is advanced to the next step SP11 and the search keyword input processing procedure RT1 is ended.

With the above configuration, when the genre selecting key 31, artist selecting key 32 and album selecting key 33 are pressed, and the wireless communication module 3 shows "genre", "artist", and "album disk" as keyword types for distinguishing and narrowing down the genre name, artist name, and album name serving as the multiple keywords to be selected, which are provided on the remote controller 5, accordingly the genre selecting notification icon 100, artist selecting notification icon 101, and album selecting notification icon 102 corresponding to the pressed genre selecting key 31, artist selecting key 32, and album selecting key 33 are displayed on the display screen 80 which is displayed on the display 3B of the display unit 54.

Accordingly, the wireless communication module 3 can allow the user to easily recognize what kind of selectable keyword types exist, by the genre selecting key 31, artist selecting key 32, and album selecting key 33 provided on the remote controller 5. Also, by displaying the genre selecting notification icon 100, artist selecting notification icon 101, and album selecting notification icon 102 displayed on the display screen 80 according to the user pressing the genre selecting key 31, artist selecting key 32 and album selecting key 33, the communication module 3 can notify the user of the selected keyword type and allow the user to easily and accurately confirm this, even in a case wherein the search keyword is to be re-selected again with an already-selected keyword type.

According to the above configuration, when the wireless communication module 3 shows "genre", "artist", and "album disk" as multiple keyword types for distinguishing and narrowing down the genre name, artist name, and album name serving as multiple keywords to be selected, and the genre selecting key 31, artist selecting key 32 and album selecting key 33 used for selecting these multiple keyword types are pressed for the purpose of selecting a keyword type, the genre selecting notification icon 100, artist selecting notification icon 101, and album selecting notification icon 102 corresponding to the pressed genre selecting key 31, artist selecting key 32, and album selecting key 33 are accordingly displayed on the display 3B. Thus, with the multiple genre selecting key 31, artist selecting key 32, and album selecting key 33, the wireless communication module 3 can allow the user to easily and accurately confirm what kind of keyword types exit, and also by displaying the genre selecting notification icon 100, artist selecting notification icon 101 and album selecting notification icon 102 according to the user pressing the genre selecting key 31, artist selecting key 32, and album selecting key 33, the user can easily confirm which keyword type has been selected, and thus the search keyword can be easily selected.

Also, when the keyword type is selected by the genre selecting key 31 or artist selecting key 32 being pressed, the wireless communication module 3 accordingly displays the genre selecting notification icon 100 or artist selecting notification icon 101 on the display 3B, and following this if the artist selecting key 32 or album selecting key 33 is pressed and a keyword type of a lower level than the previously selecting keyword type is newly selected, the artist selecting notification icon 101 or album selecting notification icon 102 corresponding to keyword types of a lower level is displayed in addition to the genre selecting notification icon 100 or artist selecting notification icon 101 previously displayed accordingly on the display 3B. Accordingly, the wireless communication module 3 can allow the user to narrow down the search criteria by notifying the user that the keywords have been accurately selected, sequentially and hierarchically from a keyword of a higher level down to a keyword of a lower level.

Conversely, when the artist selecting key 32 or the album selecting key 33 is pressed to select the keyword type, the wireless communication module 3 accordingly displays the artist selecting notification icon 101 or album selecting notification icon 102 on the display 3B, and when the genre selecting key 31 or artist selecting key 32 is pressed following this, and a keyword type of a higher level than the previously selected keyword type is newly selected, the selections of the keyword type previously selected and the search keyword selected by this keyword type are deleted accordingly. Then the wireless communication module 3 turns off the artist selecting notification icon 101 or album selecting notification icon 102 corresponding to the keyword type previously selected with the display 3B, and displays the genre selecting notification icon 100 or artist selecting notification icon 101 corresponding to the higher-level keyword type. Accordingly, when a keyword type of a higher level is selected following the selection of a lower-level keyword type, the wireless communication module 3 can easily and accurately notify the user that the selection of the lower-level keyword type has been deleted. Also, when the user changes the search keyword to a keyword type of a higher level than the lower-level keyword type, the wireless communication module 3 can allow the user to easily perform this change of search keyword, and also surely prevent an unrelated lower-level search keyword from remaining selected and thus prevent unexpected search criteria to the user from being set.

Further, the genre selecting key 31, artist selecting key 32, and album selecting key 33 are linearly disposed on the remote controller 5 for operating the wireless communication module 3, so as to correspond to a hierarchy from the higher-level keyword type to the lower-level keyword type. Accordingly, with this remote controller 5, the user can easily confirm the relation of the hierarchy as to the keyword types selectable by the user, and as a result, in the event of narrowing down the search criteria by selecting the keyword types hierarchically from the higher level to the lower level sequentially, the user can easily press the genre selecting key 31, artist selecting key 32, and album selecting key 33 along with the narrowing down of the search criteria.

Further, the wireless communication module 3 linearly disposes and displays the genre selecting notification icon 100, artist selecting notification icon 101, and album selecting notification icon 102 in order from the higher-level keyword type to the lower-level keyword type, and thus displays this on the display 3B. Accordingly, when the genre selecting key 31, artist selecting key 32, and album selecting key 33 are sequentially pressed, the wireless communication module 3 can easily confirm to the user how the keyword type has been selected and search criteria narrowed down, by the display status of the genre selecting notification icon 100, artist selecting notification icon 101 and album selecting notification icon 102.

Further, when at least one of the genre selecting key 31, artist selecting key 32, and album selecting key 33 is pressed, and at least one keyword type is selected, the wireless communication module 3 displays one of the genre name selectable notification icon 103, artist name selectable notification icon 104, or album name selectable notification icon 105 so as to surround the genre selecting notification icon 100, artist selecting notification icon 101 or album selecting notification icon 102 corresponding to the one keyword type at the lowest level of the selection thereof, and displays this on the display 3B. Accordingly, the wireless communication module 3 can allow the user to accurately confirm a single keyword type wherein the search keyword is in a selectable state, and as a result, the user can follow the hierarchy and accurately select the search keyword.

Additionally, when the keyword type is selected sequentially from the higher-level keyword to the lower-level keyword hierarchically according to the genre selecting key 31, artist selecting key 32, and album selecting key 33 being pressed, the wireless communication module 3 is arranged so that for every keyword type being selected, a search keyword selected by a keyword type of a higher level than that selected keyword type is automatically set as the search criteria. Accordingly, the wireless communication module 3 does not require performing any special operation to set the search keyword selected with the higher-level keyword type as the search criteria for every time the keyword type is selected sequentially from the higher-level keyword to the lower-level keyword hierarchically, and thus enables easily setting the search criteria.

Note that with the above-described embodiment, an arrangement has been described wherein the wireless communication module 3 uses hierarchical configuration information acquired from the server 2 to generate type lists or type partial lists and use for searching for the composition data, but the present invention is not limited to this, and a wireless communication module 3 can use the hierarchical configuration information acquired from the server 2 as is, to search for composition data.

Also, with the above-described embodiment, an arrangement has been described wherein the wireless communication module 3 searches for composition data to be played back from the composition data stored in the server 2, but the present invention is not limited to this, and the wireless communication module 3 itself can store a large amount of composition data, and the composition data to be played back can be searched from the large amount of composition data stored therewithin.

Further, with the above-described embodiment, an arrangement has been described wherein the wireless communication module 3 communicates wirelessly with the server 2, but the present invention is not limited to this, and an arrangement can be made wherein the wireless communication module 3 communicates with the server 2 via a cable, or wherein either wireless communication or communication via cable is selected appropriately.

Further, with the above-described embodiment, an arrangement has been described wherein, when the wireless communication module 3 changes the composition acquiring list, if the composition title of the composition data during playback processing using the previous composition acquiring list is included in a newly generated composition acquiring list, when the playback processing of the composition data using the new composition acquiring list is started, the composition data which has been subjected to playback processing partway with the previous composition acquiring list is subjected to playback processing from the start, but the present invention is not limited to this, and an arrangement may be made wherein, when the wireless communication module 3 changes the composition acquiring list, if the composition title of the composition data during playback processing using the previous composition acquiring list is included in a newly generated composition acquiring list, when the playback processing of the composition data using the new composition acquiring list is started, the composition data which has been subjected to playback processing partway with the previous composition acquiring list is subjected to playback processing from that point of interruption.

Further, with the above-described embodiment, an arrangement has been described wherein a search keyword input device according to an embodiment of the present invention is used for the wireless communication module 3 described above with reference to FIGS. 1 through 21, but the present invention is not limited to this, and various types of search keyword input devices can be widely used, such as information processing devices such as a computer, portable telephone, or PDA (Personal Digital Assistant), a video camera or digital still camera, or data recording/playback devices of a built-in hard disk drive type.

Further, with the above-described embodiment, an arrangement has been described wherein the content data to be searched uses the composition data described above with reference to FIGS. 1 through 21, but the present invention is not limited to this, and various types of content data can be widely used, such as picture data such as movies and so forth, program data such as game programs and so forth, or text data.

Further, with the above-described embodiment, an arrangement has been described wherein a genre name, artist name, and album name are used as multiple search keywords relating to the above-described compositions with reference to FIGS. 1 through 21, but the present invention is not limited to this, and various types of search keywords can be widely used. For example, if the object to be searched is composition data, various types of search keywords can be widely used, such as the name of the label company to which the artist belongs who performs the composition, or the name of the country of the composition recording, the year of announcement, and so forth. Also, if the object to be searched is picture data such as a movie, various types of search keywords can be widely used, such as the name of the producing company, the name of the creator such as the director, the name of the country in which the movie was produced, the names of the performers, the year of production, and so forth. Further, if the object to be searched is program data such as a game program, various types of search keywords can be widely used, such as the name of the producing company, the name of the creator, the name of the country of production, and the year of production and so forth.

Further, with the above-described embodiment, an arrangement has been described wherein "genre", "artist", and "album disk" as multiple keyword types to distinguish the multiple search keywords are used with reference to FIGS. 1 through 21, but the present invention is not limited to this, and if the object to be searched is composition data, various types of keyword types can be widely used, such as the label company to which the artist belongs who performs the composition, or the country of the composition recording, the year of announcement, and so forth. Also, if the object to be searched is picture data such as a movie, various types of keyword types can be widely used, such as the producing company, the creator, the country in which the movie is produced, the year of production, and so forth. Further, if the object to be searched is program data such as a game program, various types of keyword types can be widely used, such as the producing company, the creator, the country of production, the year of production, and so forth.

Further, with the above-described embodiment, an arrangement has been described wherein multiple keyword types are shown for distinguishing multiple search keywords and narrowing down for selecting, and the genre selecting key 31, artist selecting key 32, and album selecting key 33 provided on the remote controller 5 described above with reference to FIGS. 1 through 21 are used as the multiple keyword type selecting keys which are used for selecting the multiple keyword types, but the present invention is not limited to this, and other various types of keyword type selection keys can be widely used, such as a keyword type selecting key provided on the wireless communication module 3 main unit, or a touch-panel type keyword type selecting key.

Further, with the above-described embodiment, an arrangement has been described wherein a control unit 50 with a microcomputer configuration described above with reference to FIGS. 1 through 21 is used as the control unit for controlling the selecting notification display elements corresponding to the instructed keyword type selecting key displayed on the display unit, when a keyword type selecting key for selecting a keyword type is instructed, but the present invention is not limited to this, and other various types of control units can be widely used, such as a central processing unit and so forth.

Moreover, with the above-described embodiment, an arrangement has been described wherein a computer-readable medium storing a search keyword input program for causing a computer to execute any one of the aforementioned methods. A computer-readable medium can include, for example, a hard disk or a memory (such as ROM or RAM).

It should be understood by those skilled in the art that various modifications, combinations, sub-combinations and alterations may occur depending on design requirements and other factors insofar as they are within the scope of the appended claims or the equivalents thereof.

What is claimed is:

1. A search keyword input device comprising:
keyword type selection keys for selecting keyword types for distinguishing and narrowing down search keywords presented for selection, wherein the keyword types are organized in a hierarchy;
a display unit for displaying one or more notification display elements corresponding to the keyword types, wherein the notification display elements indicate which of the keyword types are selected; and
a control unit for controlling which of the notification display elements are displayed, and configured to:
determine, at a first time, which of the keyword type selection keys is pressed,
instruct the display unit to display the notification display element corresponding to a first keyword type associated with the first pressed keyword type selection key,
determine, at a second time, which of the keyword type selection keys is pressed,
when it is determined that the pressed keyword type selection key was pressed again, switch a keyword selection from a first keyword to a second keyword, the first keyword and the second keyword being of the first keyword type,
when it is determined that the second keyword type selection key pressed is different from the first keyword type selection key, determine whether or not a second keyword type of a lower hierarchical level than the first keyword type, the second keyword type being associated with the different keyword type selection key,
when it is determined that the second selected keyword type is of a lower hierarchical level than the first selected keyword type, instruct the display unit to display the notification display element corresponding to the second selected keyword type in addition to the notification display element corresponding to the first selected keyword type, and
when it is determined that the second selected keyword type is of a higher hierarchical level than the first selected keyword type, instruct the display unit to display the notification display element corresponding to the second selected keyword type and to stop displaying the notification display element corresponding to the first selected keyword type.

2. The search keyword input device according to claim 1, wherein the keyword type selection keys are disposed linearly in order from the keyword type selection key for the highest hierarchical level to the keyword type selection key for the lowest hierarchical level.

3. The search keyword input device according to claim 1, wherein the notification display elements are displayed linearly in order from the notification display element corresponding to the keyword type of the highest hierarchical level to the notification display element corresponding to the keyword type of the lowest hierarchical level.

4. The search keyword input device according to claim 1, wherein the control unit is further configured to indicate that search keywords corresponding to the keyword type of the lowest hierarchical level selected are selectable.

5. A search keyword input method comprising:
selecting a first one of keyword types distinguishing and narrowing down search keywords, wherein the keyword types are organized in a hierarchy, and the keyword types are selected using keyword type selection keys;
displaying, on a display, a notification display element corresponding to the first selected keyword type;
determining, after the first selection, which of the keyword type selection keys is pressed,
when it is determined that the pressed keyword type selection key was pressed again, switching a keyword selection from a first keyword to a second keyword, the first keyword and the second keyword being of the first keyword type, when it is determined that the second keyword type selection key pressed is different from the first keyword type selection key, determining whether or not a second keyword type of a lower hierarchical level than the first keyword type, the second keyword type being associated with the different keyword type selection key, when it is determined that the second selected keyword type is of a lower hierarchical level than the first selected keyword type, displaying the notification display element corresponding to the second selected keyword type in addition to the notification display element corresponding to the first selected keyword type; and when it is determined that the second selected keyword type is of a higher hierarchical level than the first selected keyword type, displaying the notification display element corresponding to the second selected keyword type and stopping the display of the notification display element corresponding to the first selected keyword type.

6. A computer-readable medium storing a search keyword input program for causing a computer to execute a method comprising:

selecting a first one of keyword types distinguishing and narrowing down search keywords, wherein the keyword types are organized in a hierarchy, and the keyword types are selected using keyword type selection keys;

displaying, on a display, a notification display element corresponding to the first selected keyword type;

determining, after the first selection, which of the keyword type selection keys is pressed, when it is determined that the pressed keyword type selection key was pressed again, switch a keyword selection from a first keyword to a second keyword, the first keyword and the second keyword being of the first keyword type, when it is determined that the second keyword type selection key pressed is different from the first keyword type selection key, determining whether or not a second keyword type of a lower hierarchical level than the first keyword type, the second keyword type being associated with the different keyword type selection key, when it is determined that the second selected keyword type is of a lower hierarchical level than the first selected keyword type, displaying the notification display element corresponding to the second selected keyword type in addition to the notification display element corresponding to the first selected keyword type; and when it is determined that the second selected keyword type is of a higher hierarchical level than the first selected keyword type, displaying the notification display element corresponding to the second selected keyword type and stopping the display of the notification display element corresponding to the first selected keyword type.

* * * * *